(12) United States Patent
Weiss et al.

(10) Patent No.: US 11,987,396 B2
(45) Date of Patent: May 21, 2024

(54) FAIL-SAFE VEHICLE RENDEZVOUS IN CASE OF TOTAL CONTROL FAILURE

(71) Applicant: Mitsubishi Electric Research Laboratories, Inc., Cambridge, MA (US)

(72) Inventors: Avishai Weiss, Cambridge, MA (US); Daniel Aguilar Marsillach, Boulder, CO (US); Stefano Di Cairano, Newton, MA (US); Uros Kalabic, Jamaica Plain, MA (US)

(73) Assignee: MITSUBISHI ELECTRIC RESEARCH LABORATORIES INC., Cambridge, MA (US)

( * ) Notice: Subject to any disclaimer, the term of this patent is extended or adjusted under 35 U.S.C. 154(b) by 943 days.

(21) Appl. No.: 16/914,383

(22) Filed: Jun. 28, 2020

(65) Prior Publication Data
US 2021/0403182 A1     Dec. 30, 2021

(51) Int. Cl.
*B64G 1/00*     (2006.01)
*B64G 1/24*     (2006.01)
*B64G 1/64*     (2006.01)

(52) U.S. Cl.
CPC ............ *B64G 1/646* (2013.01); *B64G 1/242* (2013.01)

(58) Field of Classification Search
CPC ........... B64G 1/646; B64G 1/242; B64G 3/00
See application file for complete search history.

(56) References Cited

U.S. PATENT DOCUMENTS

| | | | |
|---|---|---|---|
| 10,882,644 B1 * | 1/2021 | Schwarz | B64G 1/36 |
| 11,377,237 B1 * | 7/2022 | Monda | B64G 1/646 |
| 2009/0132105 A1 * | 5/2009 | Paluszek | B64G 1/26 |
| | | | 701/13 |

(Continued)

OTHER PUBLICATIONS

Dueri, D et al. Finite-Horizon Controllability and Reachability for Deterministic and Stochastic Linear Control Systems with Convex Constraints. 2014 American Control Conference, pp. 5016-5023 [online],[retrieved on Jul. 28, 2022]. [Retrieved from Internet at https://ieeexplore.ieee.org/document/6859302] (Year: 2014).*

(Continued)

*Primary Examiner* — Peter D Nolan
*Assistant Examiner* — Peter Y Ning
(74) *Attorney, Agent, or Firm* — Gennadiy Vinokur; Hironori Tsukamoto; LABORATORIES

(57) ABSTRACT

A system for controlling an operation of a vehicle to rendezvous with a target over a finite time horizon, wherein the vehicle and the target form a multi-object celestial system. A processor to formulate passive unsafe regions as passive safety constraints. The passive unsafe regions represents regions of space around the target guaranteeing collision trajectories with the target, in an event of total thruster failure. Update a controller having a model of dynamics of the vehicle with received data, and subject the updated controller to the passive safety constraints to generate control commands that produce a collision free rendezvous trajectory which avoids unsafe regions for the specified time period, guaranteeing a collision free trajectory with respect to the target in the event of the total vehicle thruster failure, so the vehicle does not collide with the target. Output the control commands to activate or not activate thrusters of the vehicle.

27 Claims, 22 Drawing Sheets

(56) References Cited

U.S. PATENT DOCUMENTS

| | | | | |
|---|---|---|---|---|
| 2013/0126678 A1* | 5/2013 | Romney, Jr. | ............ | B64G 1/26 |
| | | | | 244/172.4 |
| 2018/0118377 A1* | 5/2018 | Garber | ................ | B64G 1/242 |
| 2020/0180633 A1 | 6/2020 | Wu | | |
| 2020/0354089 A1* | 11/2020 | Yakimenko | ............ | B64G 1/36 |
| 2021/0292011 A1* | 9/2021 | Limotta | ............... | G06N 3/084 |

OTHER PUBLICATIONS

Starek, J et al. Fast, Safe, and Propellant-Efficient Spacecraft Planning under Clohessy-Wiltshire-Hill Dynamics. arXiv: 1601.00042v1 [cs.SY] Jan. 1, 2016 [online], [retrieved on Jul. 28, 2022]. Retrieved from the Internet <URL: https://arxiv.org/pdf/1601.00042.pdf> (Year: 2016).*

Starek et al. Fast, Safe and Propellent efficient spacecraft planning under clohessy wiltshire hill dynamics. XP080960086.

Qi et al. Constant thrust collision avoidance maneuver under thruster failure. XP028433856.

Gavilan et al. Chance constrained model predictive control for spacecraft rendezvous with disturbance estimation. xp028393100.

* cited by examiner

Algorithm 1 Fail-safe Rendezvous Control

---

Offline: Compute full AE and KOE LTV BRSI (17)

AE & KOE Approach
1: input: $x(t)$
2: repeat
3:    Project $x_{k|t}$ on all ellipsoids $\mathcal{E}_i \in \tilde{\mathcal{R}}(t; P, t_f) \; \forall k$ (24)
4:    Select furthest hyperplanes from origin (27) $\forall k$
5:    Solve optimal control problem (32)
6:    Apply control policy (33) to the chaser spacecraft
7: until Spacecraft enters AE or KOE bounding Box (34)

Final Approach
8: input: $x(t)$
9: repeat
10:   Solve optimal control problem (32)
11:   Apply control policy (33) to the chaser spacecraft
12: until Converged to the target

FIG. 4

$i$ = Inclination
$\omega$ = Argument of Periapsis
$\Omega$ = Longitude of Ascending Node
$N_1$ = Ascending Node
$N_2$ = Descending Node

FAIL-SAFE VEHICLE RENDEZVOUS IN CASE OF TOTAL CONTROL FAILURE

FIELD

The present disclosure relates generally to controlling an operation of a chaser spacecraft, and more particularly to a fail-safe control policy for chaser spacecraft rendezvous on elliptic orbits using backwards reachable sets and model predictive control (MPC) in the event of a complete loss of thruster control.

BACKGROUND

Safe rendezvous for a chase spacecraft to target is an ability to avoid a collision between the chaser spacecraft and its target in the event of a complete loss of control. Conventional chaser spacecraft approaches include a trajectory generation process, completed in open-loop, wherein the rendezvous has open-loop trajectory design and then employs a suboptimal closed-loop trajectory tracking scheme. This partial open loop method requires simulations done on earth, and is not fully generalizable to arbitrary maneuvers.

For example, space rendezvous is a set of orbital maneuvers performed during which two spacecraft, i.e. chaser spacecraft and a target or space station, arrive at the same orbit and approach to a very close distance (e.g. within visual contact). Rendezvous requires a precise match of the orbital velocities and position vectors of the two spacecraft, allowing them to remain at a constant distance through orbital station-keeping. Rendezvous may or may not be followed by docking or berthing, procedures which bring the spacecraft into physical contact and create a link between them. Further, the same rendezvous technique can be used for spacecraft "landing" on natural objects if there is a weak gravitational field, e.g. landing on an asteroid or on one of the Martian moons would require the same matching of orbital velocities, followed by a "descent" that shares some similarities with docking.

However, safe rendezvous to targets presents several challenges for chaser spacecraft. A critical criteria for rendezvous is the maintenance of passive safety, that is, an ability to avoid a collision between a chaser spacecraft and its target, and achieving safe rendezvous for the chaser spacecraft is difficult, as learned from the Demonstration of Autonomous Rendezvous Technology (DART) mission launched Apr. 15, 2005. The DART mission was set out on a 24-hour mission to meet and fly around an aging military communications satellite dubbed Mublcom. The mission ended less than 11 hours later after DART collided with Mublcom, instead of performing a series of precise maneuvers around the small spacecraft. After a 4.5-month, $1 million investigation into the mishap, Scott Croomes, the NASA engineer who chaired the DART Mishap Investigation Board, said the mission's failure stemmed from a combination of spacecraft navigation errors traced back to missteps by the vehicle's Orbital Sciences Corp., led design team. Croomes also said the DART's GPS receiver misstated DART's velocity, and the software designers had not adequately accounted for any such receiver bias. Where, in the designing of the software model, the team used to simulate the receiver during testing which assumed the receiver measured velocity perfectly. Nevertheless, the NASA spokeswoman Kim Newton, at the time, said the agency's investment in autonomous rendezvous and docking technology needed to continue, and be more advanced.

Further, the National Research Council recognizes that autonomous relative guidance, navigation, and control algorithms are some of the highest-priority technologies for future spacecraft missions. Such techniques play a fundamental role in acquiring valuable scientific data and in the exploration of the solar system. For increasingly complex and autonomous missions, there is a need to develop more robust, reliable, and, importantly, fail-safe relative guidance, navigation, and control algorithms.

Therefore, a need exists in the art for an improved way to control an operation of a chaser spacecraft, for safe rendezvous that includes method approaches preventing the chaser spacecraft from colliding with the target in the event of a complete loss of thruster control, among other aspects.

SUMMARY

The present disclosure relates to a fail-safe control policy for spacecraft rendezvous on orbits including elliptic orbits, such as generic elliptic orbits, using backwards reachable sets and model predictive control (MPC) in the event of a complete loss of thruster control.

The backwards reachable sets are computed as unsafe regions of state space around the target guaranteeing collision trajectories with the target, in an event of total chaser spacecraft thruster failure within a specified time-period. The backwards reachable sets are incorporated or formulated as passive-safety constraints in the MPC online trajectory generation, in order to guide the chaser spacecraft to rendezvous with the target through an inherently safe approach.

In other words, some embodiments of the present disclosure can include a controller configured for controlling an operation of the chaser spacecraft to rendezvous the chaser spacecraft with a target over a finite time horizon. Wherein the target can be one of a spacecraft, a celestial body or orbital debris. The finite time horizon of the chaser spacecraft begins at a starting position and continues with multiple specified time periods, and ends when the chaser spacecraft arrives at the target location. Current data is accepted from sensors, the data can include values of chaser spacecraft states and the target states in a multi-object celestial system at a specified time period within the finite time horizon. The chaser spacecraft states and the target states in the multi-object celestial system can include one or combination of positions, orientations, and translational and angular velocities of the chaser spacecraft and the target, and perturbations acting on the multi-object celestial system, wherein the chaser spacecraft and the target form the multi-object celestial system. For example, the perturbations acting on the multi-object celestial system can be natural orbital forces such as solar and lunar gravitational perturbations, anisotropic gravitational perturbations due to a central body's non-sphericity, solar radiation pressure, and air drag.

Using a processor at the specified time period, the processor is configured to identify a target orbit location from the accepted data. For example, the target orbit location can be determined based on uploaded ephemeris from a ground station, based on ground data obtained in satellite tracking databases, or estimated from onboard sensor measurements on the vehicle obtained from the accepted data.

Upon determining the target orbit location, the processor accesses unsafe regions, i.e. passive unsafe regions, from a memory, and uses target orbit location at the specified time period to identify a set of unsafe regions from the stored unsafe regions. The unsafe regions can be stored in an unsafe region database, i.e. passive unsafe region database, so as to select a set of unsafe regions, i.e. a set of passive unsafe regions, by corresponding the target orbital location at that specified time period with the set of unsafe regions of the unsafe regions stored in the unsafe region database. The passive unsafe regions represents regions of space around the target guaranteeing collision trajectories with the target, in an event of total vehicle thruster failure within the specified time period.

The processor can then convert or formulate the set of unsafe regions into safety constraints, i.e. passive safety constraints, and send the safety constraints to the controller. Depending on a user specific controller design configuration(s), the controller can include a control module, wherein the controller or control module can be configured to process such converting or formulating steps. The controller can include a model of dynamics of the vehicle, such that the controller is updated with the accepted data. Upon updating, the updated controller is subject to the safety constraints to generate control commands that produce a collision free rendezvous trajectory which avoids unsafe regions for the specified time period, guaranteeing a collision free trajectory with respect to the target in the event of the total vehicle thruster failure, so the vehicle does not collide with the target. Wherein the control commands can be outputted to activate or not activate one or more thrusters of the vehicle for the specified time period based on the control commands.

The control commands may be outputted to an operations module of the controller, such that the operations module can communicate the control commands to a thruster command module that receives the control commands as delta v commands. The thruster command module can then convert the delta v commands to thruster commands, and send the thruster commands to a thruster processor of at least one thruster, to activate or not activate the at least one thruster for trajectory-tracking control of the vehicle, according to the converted delta v commands.

Another embodiment of the present disclosure can use a trajectory generation function of the controller that uses the current data or accepted data, to identify the target orbit location at the specified time-period of multiple specified time-periods within a finite time horizon.

However, in order to develop some of the embodiments of the present disclosure there were assumptions and realizations that assisted in their development. Some assumptions made in terms of a spacecraft model, included the target and the chaser spacecraft configured to be in orbit around a central body, i.e. Earth. Further assumed is that both the target and chaser spacecraft's bodies to be rigid and all external forces acting on the chaser spacecraft are assumed to act on a center of mass of their respective bodies. For the purposes of rendezvous, some calculations had to be resolved relative to positions and velocities of the chaser in the target's orbital frame, which is later explained in detail.

At least one realization of the present disclosure included combining concepts from reachability and model predictive control (MPC), to design an online trajectory generation algorithm that produces passively safe rendezvous trajectories for the chaser spacecraft to its target on generic elliptic orbits. Reachability studies the problem of determining the subset of the state space which can be steered via an admissible control sequence to any given target set, while guaranteeing that the state constraints will be satisfied for all allowable disturbance sequences. By using backwards reachability, starting at the target, we can determine the set of states that lead to the target. In this case, the set of states that lead to the target without any control, are passively unsafe, that is, they naturally evolve over time in a manner that would collide with the target. It is a realization that unlike in most experimental applications of reachability tested that dictate a spacecraft must remain inside reachable sets, for the aspects of the present disclosure, the reachable sets are used to characterize unsafe sets in state space which a chaser spacecraft must avoid. Therefore, it is a realization that by using MPC to avoid this unsafe region, computed using backwards reachability, we can generate passively safe trajectories that, in the event of a total control failure, never collide with the target.

Model predictive control (MPC) is based on an iterative, finite horizon optimization of a model of a spacecraft, a set of objectives of the motion of the spacecraft, and constraints on the spacecraft propulsion system and motion, and has the ability to anticipate future events to take appropriate control actions. This is achieved by optimizing the operation of the spacecraft according the set of objectives, over a future finite time-horizon with prediction obtained according to the model of the spacecraft subject to constraints, and only implementing the control over the current timeslot. For example, the constraints can represent physical limitation of the spacecraft, safety limitations on the operation of the spacecraft, and performance limitations on a trajectory of the spacecraft. A control strategy for the spacecraft is admissible when the motion generated by the spacecraft for such a control strategy satisfies all the constraints. For example, at time t, the current state of the spacecraft is sampled and an admissible cost minimizing control strategy is determined for a relatively short time horizon in the future. Specifically, an online or real-time calculation determines a cost-minimizing control strategy until time t+T. After the step of the control is implemented, the state is sampled again and the calculations are repeated starting from the now current state, yielding a new control and new predicted state path. The prediction horizon shifts forward, and for this reason MPC is also called receding horizon control. It is a realization that by formulating constraints in the MPC to control the spacecraft in a manner that avoids the unsafe region calculated using backwards reachability, we can guarantee that in the event of a total loss of control the spacecraft will not passively drift and collide with the target.

It is possible to use MPC alone in a brute-force approach to produce passively safe rendezvous trajectories for the chaser spacecraft to its target on generic elliptic orbits, as tested in experimentation. However, in order to do so, one needs to formulate a very large number of safety constraints that creates a very large optimization problem, and results in a very high computational burden which may not be able to be implemented in the computational resource constrained hardware in spacecraft. Furthermore, this experimental MPC would only produce a single passively safe rendezvous trajectory for the current assumed state of the chaser spacecraft. If there was any error or uncertainty with regard to the current state of the spacecraft, the safety constraints formulated in the MPC would not actually ensure safe operation of the spacecraft in the event of total thruster failure for the true state. It is a realization that by combining the concepts of reachability and MPC we are able to offload the safety computations from the MPC into a separate offline (or online) computation of the unsafe regions to avoid, thereby both reducing the computational burden of and speeding up the solving of the optimization problem in the MPC, while additionally adding robustness to the method in order to categorize wide regions of safe and unsafe state space so that the MPC would guarantee safe operation (collision free rendezvous trajectories) for a large range of chaser spacecraft states.

Another realization realized for achieving passive safety, is a backwards reachable set over a time interval (BRSI) computed from the target to determine the regions of state-space corresponding to unsafe areas, in which, in the absence of control, a chaser spacecraft would collide with the target within a specified time-period. Passive safety is a guarantee that during rendezvous a chaser spacecraft avoids a collision with its target in the event of a complete loss of control, that is, the chaser spacecraft would, in the absence of control, naturally evolve over time in a manner that does not collide with the target.

In order for computational tractability, another realization was that the nonlinear relative equations of motion about the target's generic orbit needed to be linearized, resulting in a set of linear time-varying (LTV) equations. Such that, due to the LTV nature of the system, an exact computation of the BRSI is impossible. Hence, an approximation of the unsafe region can be made with an offline computation of a union of BRSI along the target's entire orbit. The union of BRSI determines the region to be avoided, which is formulated as passive-safety constraints for the online trajectory generation process.

Another realization included was using the model predictive control (MPC) policy for enforcing the passive safety constraints, so as to ensure that the chaser spacecraft remains outside of the union of BRSI, and results in guaranteeing collision free trajectories in the event of thruster failure. The MPC policy can be referred to as a fail-safe MPC policy, a fail-safe control policy, throughout the disclosure.

The MPC policy is based on solving a receding horizon optimal control problem. For example, the MPC policy only enforces constraints that ensure passive safety. Additional constraints, e.g., on the control inputs, can also be included. The constraints enforcing LTV BRSI avoidance are non-convex, since they require avoiding a union of convex sets such as ellipsoids, polytopes, or zonotopes. This significantly complicates the finite-horizon MPC optimal control problem. In fact, even an avoidance of each convex set is described by non-convex constraints. Thus, in order to address this problem a local convexification approach is implemented, based on computing a tangent to the constraints, and then enforcing half-space constraints to ensure that passive safety can be achieved by remaining in the safe set and outside the unsafe set. Half-space constraints are constraints that constrain a state to be on one side of a hyperplane, therefore in the present disclosure we often use hyperplane constraints and half-space constraints interchangeably.

In one embodiment of the present disclosure, the tangent hyperplanes are computed by solving an optimization problem (linear program if the unsafe sets are constructed with polytopes, or a second order cone program if the unsafe sets are constructed with ellipsoids) that finds a hyperplane that separates the chaser spacecraft state from the unsafe sets.

In another embodiment of the present disclosure, the tangent hyperplanes are computed by projecting the current chaser spacecraft state radially onto the ellipsoids, selecting the furthest radial projection, and calculating the tangent hyperplane at the radial projection point. The radial distance from the current chaser spacecraft state to the surface of the ellipsoid is calculated by normalizing the current chaser spacecraft state by the shape matrix corresponding to each ellipsoid, resulting in the closets state on the ellipsoid surface.

In one embodiment of the present disclosure, the half space constraints are formulated as a chance constraints which requires that the half space constraint be satisfied with at least a priori specified probability level due to an uncertainty regarding a position of the vehicle or the target, and/or an uncertainty of a thruster magnitude or a direction. In effect, the half space constraints are "tightened" based on a priori specified probability level and the covariance of the uncertainty so that they move away from the unsafe region boundary, giving a buffer region to account for the possibility that the expected chaser spacecraft state may in actuality be closer to the unsafe region than estimated, thus guaranteeing that the chaser will remain outside the unsafe region to the a priori specified probability level.

Some embodiments of the present disclosure include an approach that is applied to a mission which is staged into three phases. A first phase constrains the controller to maintain passive safety with respect to an approach ellipsoid (AE) around the target. A second phase is initiated once the command to enter the AE is issued, maintains passive safety with respect to a keep-out ellipsoid (KOE), often also called a keep-out sphere (KOS) if the dimensions are equal in all axes. Finally, a third phase is initiated once the final approach is engaged, wherein the chaser spacecraft may enter the KOE, at which point passive safety is no longer enforced.

According to one non-limiting embodiment, the controlled chaser spacecraft is actuated by eight thrusters, each mounted in a manner aligned with the center of mass of the spacecraft so that they produce forces to change the position of the spacecraft while producing no torques to rotate the spacecraft.

According to an embodiment of the present disclosure, the objective is to rendezvous a controlled chaser spacecraft with an uncontrolled spacecraft or celestial body. In this disclosure, the spacecraft under control is also referred as a controlled spacecraft or chaser spacecraft to indicate the objective of control. Similarly, the uncontrolled spacecraft or celestial body or a region around the spacecraft or celestial body is also referred as a target, i.e., the body or region to be chased.

According to an embodiment of the present disclosure, a system for controlling an operation of a vehicle to rendezvous the vehicle with a target over a finite time horizon. A transceiver accepts data including values of vehicle states and the target states in a multi-object celestial system at a specified time period within the finite time horizon. The system including a processor to access a memory having stored passive unsafe regions, and selects a set of passive unsafe regions corresponding to an orbit the target is located at the specified time period. Wherein the set of passive unsafe regions represents regions of space around the target guaranteeing collision trajectories with the target, in an event of total spacecraft thruster failure within the specified time period. Formulate the set of passive unsafe regions as passive safety constraints. Update a controller having a model of dynamics of the vehicle with the accepted data, and subject the updated controller to the passive safety constraints to generate control commands that produce a collision free rendezvous trajectory which avoids set of passive unsafe regions for the specified time period, guaranteeing a collision free trajectory with respect to the target in the event of the total vehicle thruster failure, so the vehicle does not collide with the target. Output the control commands to activate or not activate one or more thrusters of the vehicle for the specified time period based on the control commands.

According to another embodiment of the present disclosure, a method to control a spacecraft to rendezvous the spacecraft with a target over a finite time horizon. Wherein the spacecraft and the target form a multi-object celestial system. Accepting data including values of spacecraft states and target states in the multi-object celestial system at a specified time period of multiple specified time periods within the finite time horizon. The method including accessing a memory having stored passive unsafe regions, and selects a set of passive unsafe regions corresponding to an orbit the target is located at the specified time period. Wherein the set of passive unsafe regions represents regions of space around the target guaranteeing collision trajectories with the target, in an event of total spacecraft thruster failure within the specified time period. Formulating the set of passive unsafe regions as passive safety constraints. Updating a controller having a model of dynamics of the spacecraft with the accepted data, and subject the updated controller to the passive safety constraints to generate control commands that produce a collision free rendezvous trajectory which avoids the set of passive unsafe regions for the specified time period, guaranteeing a collision free trajectory with respect to the target in the event of the total spacecraft thruster failure, so the spacecraft does not collide with the target. Outputting the control commands to activate or not activate one or more thrusters of the spacecraft for the specified time period based on the control commands.

According to another embodiment of the present disclosure, a non-transitory machine-readable medium including instructions stored thereon which, when executed by processing circuitry, configure the processing circuitry to perform operations to control a spacecraft to rendezvous the spacecraft with a target over a finite time horizon. Such that the spacecraft and the target form a multi-object celestial system. Accepts data including values of spacecraft states and the target states in the multi-object celestial system at a specified time period of multiple specified time periods within the finite time horizon. The non-transitory machine-readable medium including accessing a memory having stored passive unsafe regions, and selecting a set of passive unsafe regions corresponding to an orbit the target is located at the specified time period. Wherein the set of passive unsafe regions represents regions of space around the target guaranteeing collision trajectories with the target, in an event of total spacecraft thruster failure within the specified time period. Formulating the set of passive unsafe regions as passive safety constraints. Updating a controller having a model of dynamics of the spacecraft with the accepted data, and subject the updated controller to the passive safety constraints to generate control commands that produce a collision free rendezvous trajectory which avoids the set of passive unsafe regions for the specified time period, guaranteeing a collision free trajectory with respect to the target in the event of the total spacecraft thruster failure, so the spacecraft does not collide with the target. Outputting the control commands to activate or not activate one or more thrusters of the spacecraft for the specified time period based on the control commands.

According to another embodiment of the present disclosure, a controller to control a vehicle to rendezvous the vehicle with a target in real time over a finite time horizon. Wherein the vehicle and the target form a multi-object coordination system. A transceiver accepts data in real time including values of vehicle states and target states in the multi-object celestial system, at a specified time period within the finite time horizon. The controller including a guidance and control computer (GCC) processor having an interface to pass information in real time related to a propulsion control system of the vehicle. The GCC processor at the specified time period is configured to identify an area the target is located in real time from the accepted data. Access a memory having unsafe regions, and select a set of unsafe regions corresponding to the target area location from the stored unsafe regions. Wherein the set of unsafe regions represents regions within the area around the target in which any operation of the predetermined combination of the number of operational motors does not avoid collision with the target, guaranteeing collision trajectories with the target. Formulate the set of unsafe regions as safety constraints, and update a controller having a model of dynamics of the vehicle with the accepted data. Generate control commands by subjecting the updated controller to the safety constraints to produce a rendezvous trajectory that avoids the set of unsafe regions, guaranteeing an operation of at least the predetermined combination of the number of operational motors, in the event of partial propulsion control failure resulting in a trajectory that does not collide with the target. Output the control commands to the propulsion control system to activate or not activate one or more motors of the vehicle for the specified time period based on the control commands.

According to another embodiment of the present disclosure, a controller for controlling an operation of a vehicle to rendezvous the vehicle with a target over a finite time horizon. A transceiver accepts data including vehicle and target data at a specified time period within the finite time horizon. The controller including a processor at the specified time period is to access a memory having stored unsafe regions. Select a set of unsafe regions corresponding to an orbit the target is located from the stored unsafe regions. Wherein the set of unsafe regions represents regions of space around the target guaranteeing collision trajectories with the target, in an event of total spacecraft thruster failure. Formulate the set of unsafe regions as safety constraints. Update a controller having a model of dynamics of the vehicle with the accepted data, and subject the updated controller to the safety constraints to generate control commands that produce a collision free rendezvous trajectory which avoids the set of unsafe regions, guaranteeing a collision free trajectory with respect to the target in the event of the total vehicle thruster failure, so the vehicle does not collide with the target. Output the control commands to activate or not activate one or more thrusters of the vehicle for the specified time period based on the control commands.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4 is illustrating an algorithm associated with fail-safe rendezvous control, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
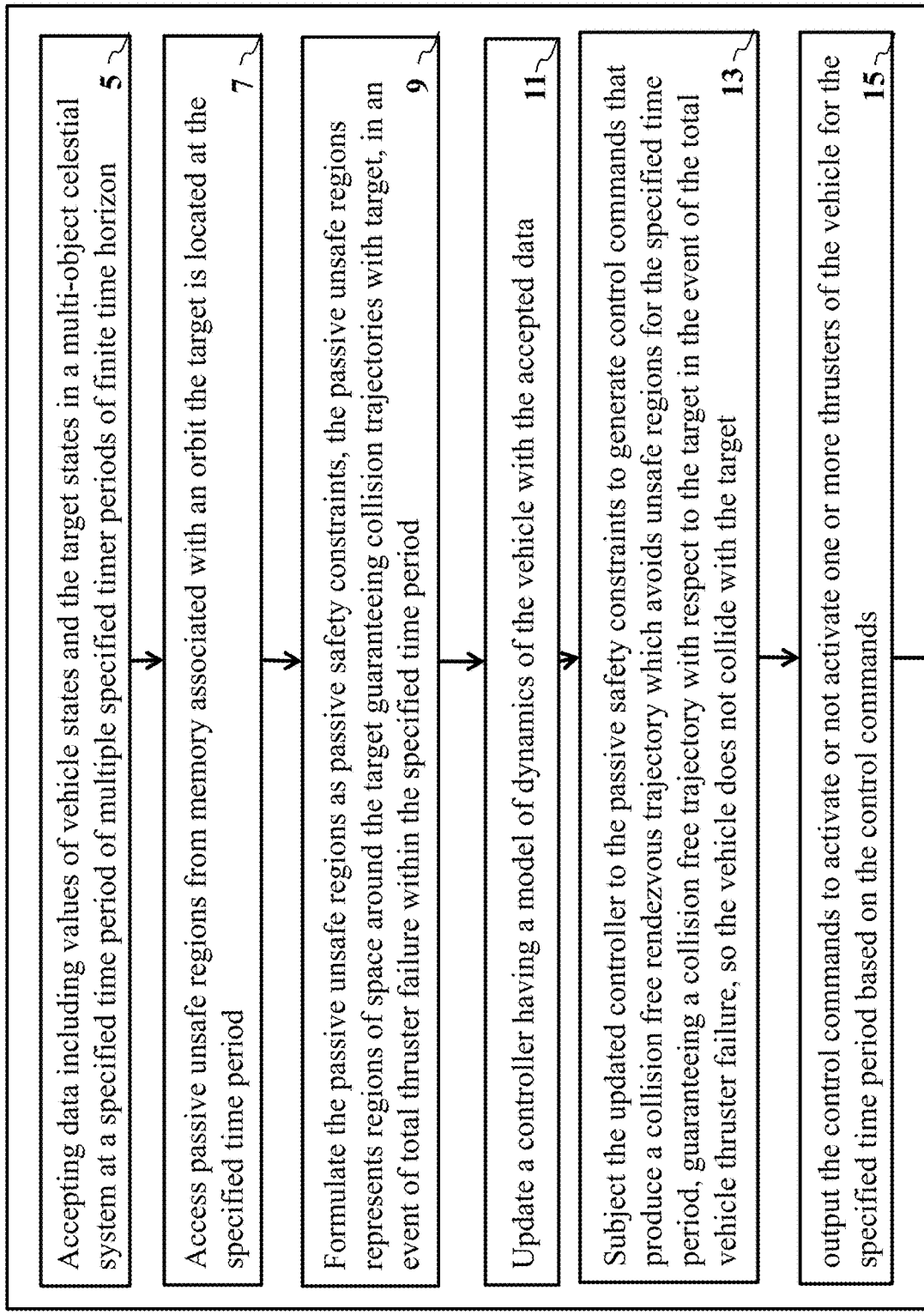
FIG. 1A is a block diagram illustrating some system and method steps for rendezvous maneuver design that is safe in the event of a complete loss of thruster control, according to an embodiment of the present disclosure.

FIG. 1A is a block diagram illustrating some system and method steps for rendezvous maneuver design that is safe in the event of a complete loss of thruster control, according to an embodiment of the present disclosure. The system and method for controlling an operation of a vehicle to rendezvous the vehicle with a target over a finite time horizon.

Step 5 of FIG. 1A includes he system having a transceiver that accepts data including values of vehicle states and the target states in a multi-object celestial system at a specified time period within the finite time horizon.

Step 7 of FIG. 1A includes a processor to access passive unsafe regions from a memory associated with an orbit the target is located at the specified time period.

Step 9 of FIG. 1A includes formulating the passive unsafe regions as passive safety constraints. Wherein the passive unsafe regions represents regions of space around the target guaranteeing collision trajectories with the target, in an event of total vehicle thruster failure within the specified time period.

Step 11 of FIG. 1A includes updating a controller having a model of dynamics of the vehicle with the accepted data.

Step 13 of FIG. 1A includes subjecting the updated controller to the passive safety constraints to generate control commands that produce a collision free rendezvous trajectory which avoids unsafe regions for the specified time period, guaranteeing a collision free trajectory with respect to the target in the event of the total vehicle thruster failure, so the vehicle does not collide with the target.

Step 15 of FIG. 1A includes outputting the control commands to activate or not activate one or more thrusters of the vehicle for the specified time period based on the control commands.

Embodiments of the present disclosure provide important solutions to orbital rendezvous which is a critical phase for missions that perform satellite servicing, active debris mitigation, in-space manufacturing, space station resupply, and planetary sample return. Passive safety analysis of a rendezvous mission of the present disclosure can be used to evaluate the total probability of collision in the event that the maneuvering chaser spacecraft experiences a fault that results in a loss of maneuvering capability. Some key factors the present disclosure considers in determining the passive safety of the rendezvous mission can include a chosen approach trajectory, state estimations of the spacecraft and target, and probability of collision calculation such as the unsafe regions. Further, orbital rendezvous and proximity operations are an important process of accomplishing mission objectives, such that, orbital rendezvous is a key technology for space exploration. Wherein, orbital rendezvous provides or allows humans to get to the moon, assemble and supply space stations, and repair the Hubble space telescope, by non-limiting example. In fact, the systems and methods of the present disclosure can be applied satellite servicing, orbital debris removal, in-space manufacturing, space station resupply, and planetary science sample return missions. Wherein for each of these missions, the operation managers will have to decide what level of risk is acceptable, and what steps they can take to reduce the risk.

As noted in the background section, safe rendezvous continues to be a "real problem", despite the numerous precautions to reduce mission risk. Over the last few years there have been several orbital rendezvous failures. For example, in 1997, an unmanned Russian Progress resupply vehicle collided with the Mir space station forcing astronauts onboard to seal off sections of the station. That same year, the ETS-VII rendezvous and docking demonstration vehicle experienced multiple anomalies during the final phases of rendezvous. In 2005, DARPA's Demonstration of Autonomous Rendezvous Technology (DART) mission experienced a fault that resulted in a collision. Thus, the systems and methods of the present disclosure provide mission stakeholders with an indication of mission risk, and just as important, provide solutions to address safe rendezvous risks.

Figure 1B:
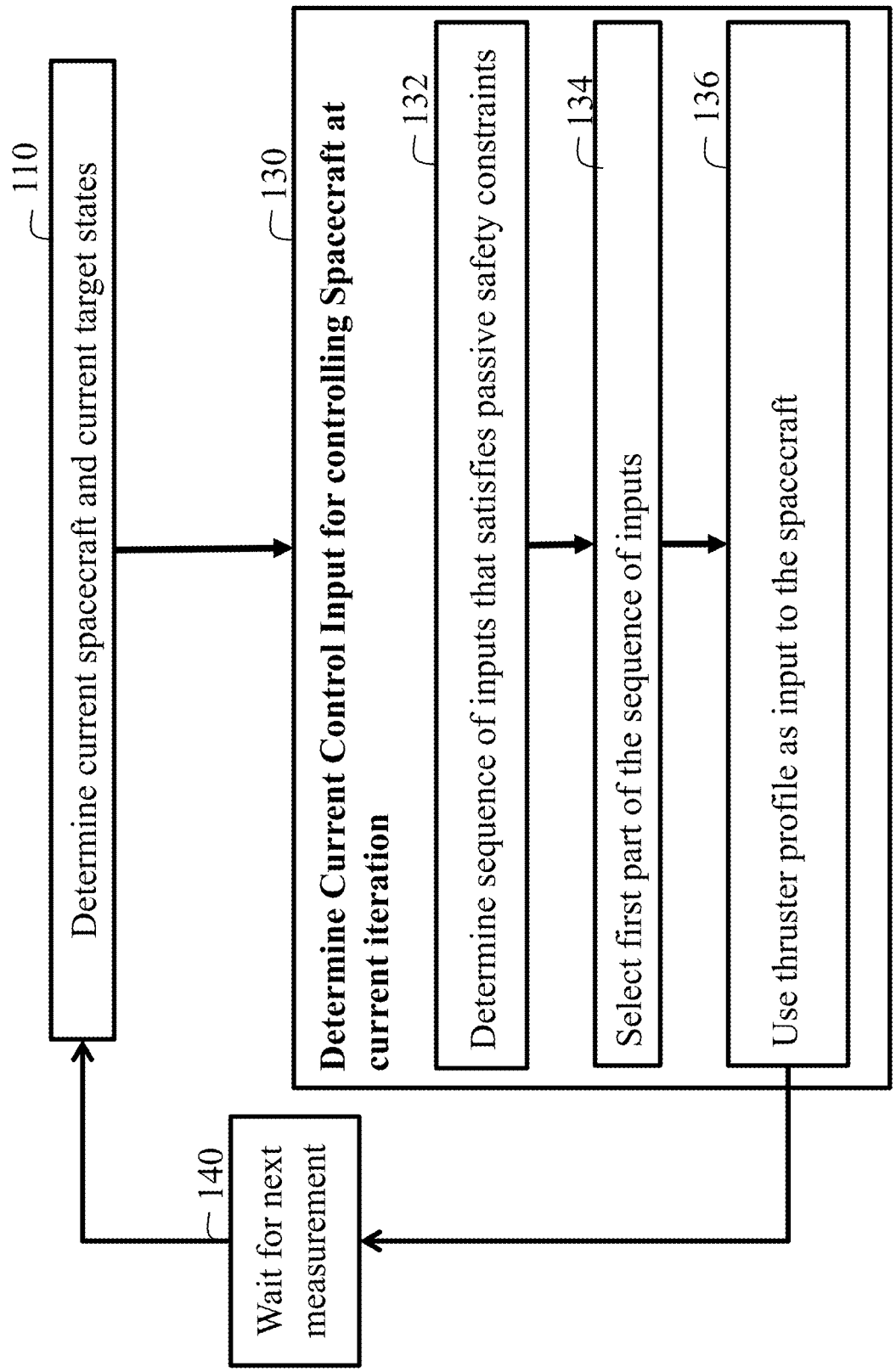
FIG. 1B is a block diagram illustrating a method for controlling an operation of a chaser spacecraft that is safe in the event of a complete loss of thruster control, according to some embodiments of the present disclosure.

FIG. 1B is a block diagram illustrating a method for controlling an operation of a chaser spacecraft that is safe in the event of a complete loss of thruster control, according to some embodiments of the present disclosure. For example, the method controls iteratively the operation of the controlled chaser spacecraft with control inputs determined using a model of the joint multi-object celestial system based on an optimization of a cost function.

An initial step 110 of FIG. 1B includes determining current states of the controlled chaser spacecraft and uncontrolled target, of which, the current states of the spacecraft and uncontrolled target can be determined using sensors, or other aspects such as hardware or software. In addition, the current states of the spacecraft and uncontrolled target can be obtained from communication with a ground command center located on Earth or another spacecraft located in outer space, e.g. GPS, relative range measurements, star trackers, horizon sensors, or the like. It is also possible to determine the current spacecraft state based on a previous control input determined for a previous iteration that is optimized with a previous cost function using a previous model of the spacecraft.

Still referring to FIG. 1B, the states determined in step 110 may be absolute states relative to the central body that the uncontrolled target and the controlled chaser spacecraft are orbiting.

Additionally, or alternatively, in some implementations, the controller 101 includes an input interface 133 configured to accept data indicative of current values of states of the controlled spacecraft and the uncontrolled target in the multi-object celestial system aim to be determined and/or determined in step 110 implemented outside of the controller 101. As used herein, the states include one or combination of positions, and translational velocities of the controlled spacecraft and the uncontrolled target, and perturbations acting on the multi-object celestial system.

Step 130 of FIG. 1B determines a current control input for controlling the spacecraft at the current iteration using the current model of the joint multi-object celestial system dynamics.

Step 132 of FIG. 1B, the method uses the current model of the joint multi-object celestial system dynamics to determine a sequence of future inputs of thruster forces from the current time instant for a fixed amount of time in the future, so long as to at least obtain new state measurements. So that, the predicted future spacecraft states and inputs satisfy the passive safety constraints on the operation of the spacecraft and constraints on the control inputs.

Step 134 of FIG. 1B, includes the first part of the input sequence, for a duration equal to an amount of time needed to obtain a new measurement of the state of the spacecraft. Which is selected and applied to the next step 136, as the current control input to the spacecraft.

Step 136 of FIG. 1B, uses the thruster profile as an input to the spacecraft.

Step 140 of FIG. 1B, based on the determined current state of the controlled chaser spacecraft and uncontrolled target step 110 and the determined current control input step 130 to the spacecraft, a next state of the controlled chaser spacecraft and uncontrolled celestial body are determined, and at step 140, the controller waits until a new state measurement is received.

Figure 1C:
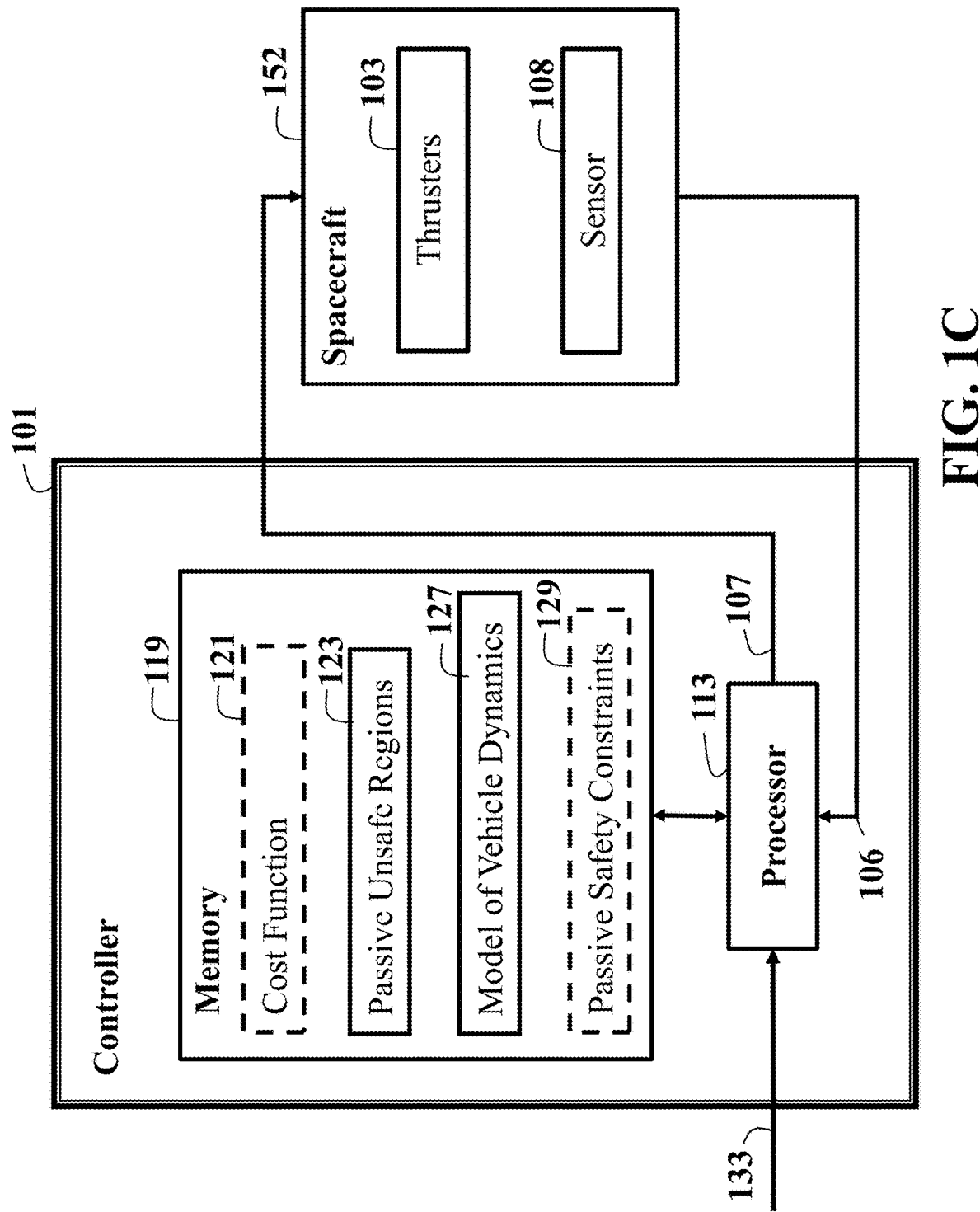
FIG. 1C is a block diagram illustrating some components of a controller implementing at least some steps of the method of FIG. 1B, according to some embodiments of the present disclosure.

FIG. 1C is a block diagram illustrating some components of a controller implementing at least some steps of the method of FIG. 1B, according to some embodiments of the present disclosure. The method of FIG. 1B, can include a control system or controller 101 that has at least one processor 113 for executing modules of the controller. The controller 101 can be in communication with a processor 113 and a memory 119. Wherein the memory can have at least one stored thereon including the cost function 121, the joint multi-object celestial system model 123, and the passive safety constraints 129.

Further, the method of FIG. 1B can determine as shown in FIG. 1C control inputs 107 via the processor 113, using an updated controller (updated using accepted or current vehicle and target data) that is subject to the passive safety constraints. Wherein, the passive safety constraints are determined by corresponding the target orbit location with a set of passive unsafe regions from the stored passive unsafe regions 123 stored in the memory 119, and then formulating the set of passive unsafe regions as passive safety constraints. The passive safety constraints 129 are subjected to the updated controller having the model of dynamics of the vehicle 127, and then later stored in the memory 119. Wherein the determined control inputs 107 can be sent to the spacecraft 102. To that end, the controller 101 can included or be operatively connected to an output interface configured to submit the control commands 107 to the thrusters of the spacecraft. Further the spacecraft 152 can have thrusters 103 and sensors 108, among other components. The current state 106 of the spacecraft 152 can be obtained from the sensors 108 and communicated to the processor 113.

Still referring to FIG. 1C, at least one embodiment can include the processor 113 to determine at least one of the cost function 121, the joint multi-object celestial system model 123, the passive safety constraints 129 during the control. For example, the control system 101 can execute method of FIG. 1C that controls iteratively the operation of the spacecraft 152 with control inputs of step 130 of FIG. 1C determined using the model 123 of the joint multi-object celestial system, based on an optimization of a cost function. It is contemplated that method of FIG. 1C could also be executed by the controller 101 based on a previously iteratively operation of the spacecraft 152, i.e. from a previously iterative control operation having a previous control input determined for a previous iteration that is optimized by a previous cost function using a previous model of the spacecraft.

Figure 1D:
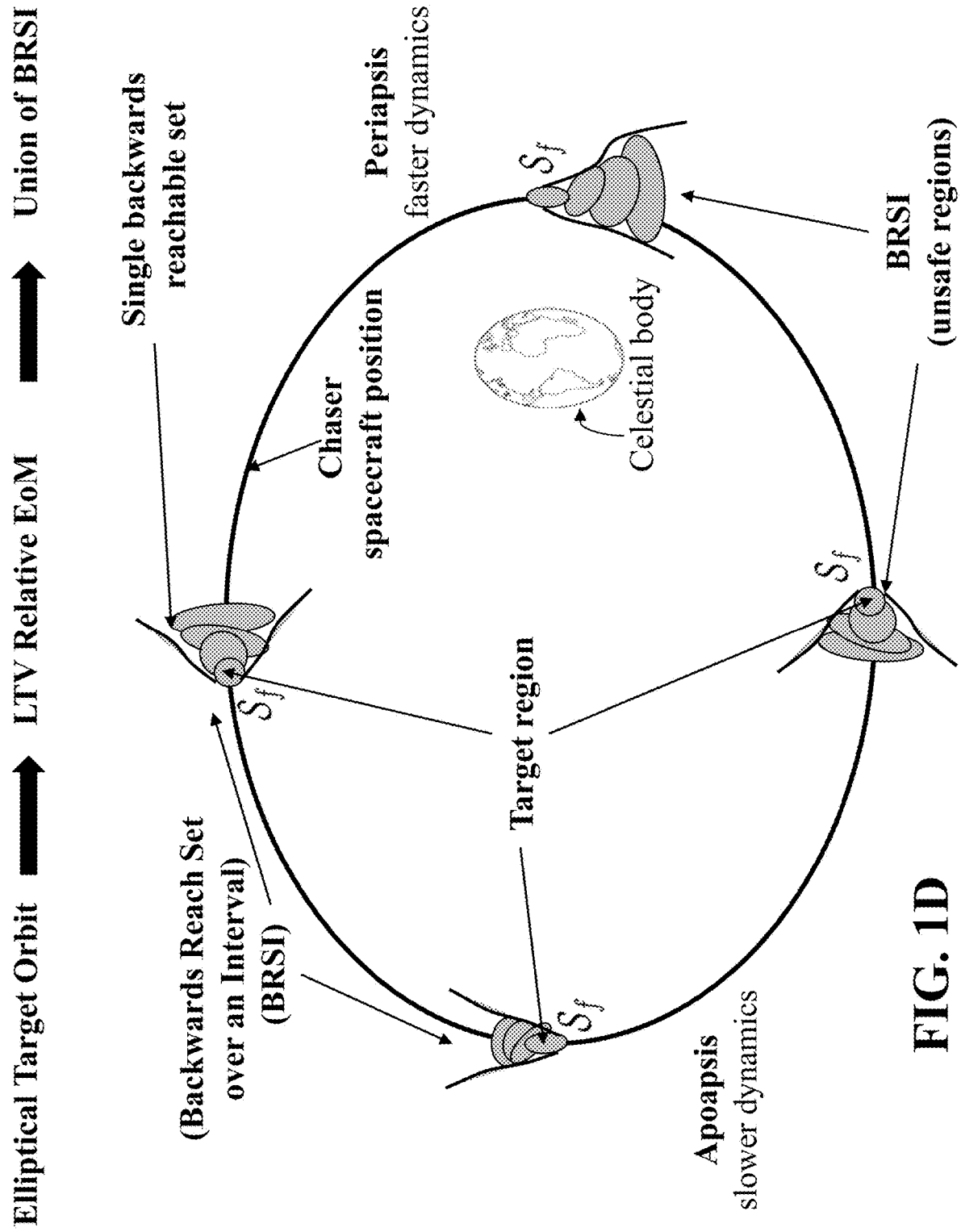
FIG. 1D is a schematic illustrating a representation of multiple backward reachable sets for multiple specified time periods projected onto a target orbital frame, according to some embodiments of the present disclosure.

FIG. 1D is a schematic illustrating a representation of multiple backward reachable sets for multiple specified time periods projected onto a target orbital frame, according to some embodiments of the present disclosure; For computational tractability, the nonlinear relative equations of motion about the target's generic elliptic orbit are linearized, resulting in a set of linear time-varying (LTV) relative equations of motion (EoM). The LTV nature of the system means that the dynamics of a chaser spacecraft in the vicinity of periapsis (closest point to the central body) behave differently than at apoapsis (farthest point to the central body). Due to the LTV nature of the system, exact computation of the BRSI is impossible, hence we conservatively approximate the unsafe region with offline computation of the union of BRSI along the target's entire orbit. The union of BRSI determines the unsafe region to be avoided, which is formulated as passive-safety constraints for the online trajectory generation process.

Still referring to FIG. 1D, a model predictive control (MPC) policy is developed that enforces that the chaser spacecraft avoids the unsafe region as it rendezvous with a target or target region, thus ensuring that the chaser spacecraft remains outside of the union of BRSI, and hence guaranteeing collision free trajectories in the event of total thruster failure. The MPC policy can be referred to as a fail-safe MPC policy, a fail-safe control policy, throughout the disclosure.

The proposed approach is applied to a mission staged into three phases. The first phase constrains the controller to maintain passive safety with respect to an approach ellipsoid (AE) around the target. Once the command to enter the AE is issued, the second phase maintains passive safety with respect to a keep-out ellipsoid (KOE). Finally, the third phase, once the final approach is engaged, the chaser spacecraft may enter the KOE, at which point passive safety is no longer enforced.

Figure 2:
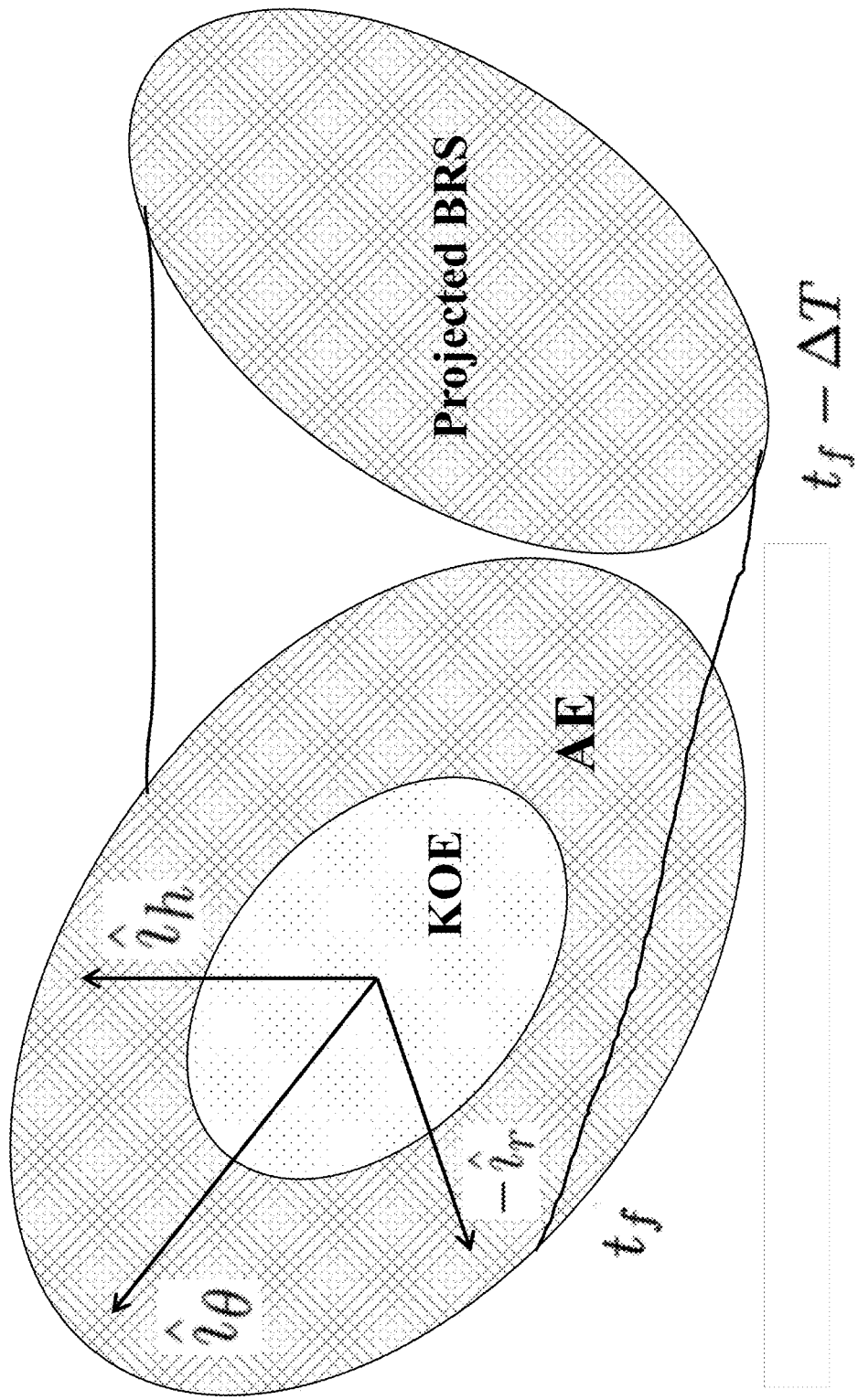
FIG. 2 is a schematic illustrating a representation of a backward reachable set projected onto a target orbital frame, showing an approach ellipsoid (AE) and a keep-out ellipsoid (KOE), according to some embodiments of the present disclosure.

FIG. 2 is a schematic illustrating a representation of a single backward reachable set of an approach ellipsoid (AE) at $\Delta T$ seconds before $t_f$ projected onto a target orbital frame, showing an approach ellipsoid (AE) and a keep-out ellipsoid (KOE), according to some embodiments of the present disclosure. States in the $\Delta T$ backwards reachable set of the AE flow into the AE in $\Delta T$ seconds.

For example, the concepts from reachability (such as backwards reachable sets) and receding-horizon control are combined to design an online trajectory generation algorithm that produces passively safe rendezvous trajectories for a chaser spacecraft to its target on generic elliptic orbits. For achieving passive safety, we compute the backwards reachable set over a time interval (BRSI) from the target to determine the regions of state-space corresponding to unsafe areas in which, in the absence of control, a chaser spacecraft would collide with the target within a specified time-period.

As noted above, FIG. 2 provides an illustration of the AE and KOE, and a backwards reach set projected onto the orbital frame.

Preliminaries and Notation: Vectors are presented using boldface notation. A reference frame, $F_x$, is defined at an origin and consists of three orthonormal dextral basis vectors $\{\hat{i}, \hat{j}, \hat{k}\}$. The angular velocity vector of frame $F_x$ with respect to $F_y$ is denoted by $\omega_{x/y}$. $\mathbb{R}^n$ denotes the n-dimensional Euclidean space. A derivative with respect to the inertial frame is denoted by ${}^e(\dot{\cdot})$ whereas a derivative with respect to another frame is denoted by $(\dot{\cdot})$.

SPACECRAFT MODEL: Consider a target and a chaser in orbit around a central body. Without loss of generality, in this work that central body is Earth. The frame $F_e$ is the Earth-Centered Inertial (ECI) frame, e is an unforced particle, and it is assumed that e is collocated with the center of the Earth. The chaser's center of mass is denoted by c and has a chaser-fixed frame $F_c$. The target's center of mass is denoted by t and has a target-fixed frame $F_t$. In this work we assume the target is aligned with its orbital frame such that it has the radial (R-Bar), along-track (V-Bar), and cross-track (H-Bar) basis vectors: $F_t = \{\hat{i}_r, \hat{i}_\theta, \hat{i}_h\}$. The target orbital frame's angular velocity with respect to the inertial frame is $\omega_{t/e}$. Both the target and chaser's bodies are assumed to be rigid and all external forces acting on the spacecraft are assumed to act on the center of mass of their respective bodies.

Still referring to FIG. 2, the translational equations of motion for the target and chaser relative to the inertial frame $F_e$ are given by $$^e\ddot{r}_t = -\mu \frac{r_t}{\|r_t\|^3} + \frac{f_t}{m_t}, \tag{1}$$

$$^e\ddot{r}_c = -\mu \frac{r_c}{\|r_c\|^3} + \frac{f_c}{m_c}, \tag{2}$$

where $r_t$, $r_c$ are the position vectors of the target and chaser center of mass relative to the center of their central body, $m_t$, $m_c$ are the target and chaser masses, $\mu$ is the gravitational constant of the central body, and $f_t$, $f_c$ represent perturbing forces acting on the target and chaser, respectively. These perturbations include orbital perturbations as well as control. In this study, the target is assumed to follow Keplerian motion, i.e. ft=0, and we neglect orbital perturbations on the chaser.

Given a target and chaser, the relative distance between their centers of mass is given by $$r_{rel} = r_c - r_t = [\delta_x, \delta_y, \delta_z]^T. \tag{3}$$

Still referring to FIG. 2, for the purposes of rendezvous, it is of interest to resolve relative positions and velocities of the chaser in the target's orbital frame. Taking the derivative of the relative position (3) with respect to the target's orbital frame $F_t$ yields $$\dot{r}_{rel} = {}^e\dot{r}_t - {}^e\dot{r}_c - \omega_{t/e} \times r_{rel}. \tag{4}$$

Taking the derivative of the relative velocity (4) with respect to the target's orbital frame $F_t$ yields $$\ddot{r}_{rel} = {}^e\ddot{r}_t - {}^e\ddot{r}_c - \dot{\omega}_{t/e} \times r_{rel} + \omega_{t/e} \times (\omega_{t/e} \times r_{rel}) - 2\omega_{t/e} \times \dot{r}_{rel}. \tag{5}$$

Finally, substituting (1), (2) into (5) yields the full nonlinear relative equations of motion. For $$\|r_{rel}\| \ll \|r_t\|, \tag{6}$$

the equations of relative motion (5) can be linearized with respect to the target's trajectory, yielding $$\delta\ddot{x} - \left(\frac{2\mu}{r_t^3} + \frac{h^2}{r_t^4}\right)\delta x + \left(\frac{2^\varphi r_t^\top r_t}{r_t^4}h\right)\delta y - \left(\frac{2h}{r_t^2}\right)\delta\dot{y} = \frac{u_1}{m_c}, \tag{7}$$

$$\delta\ddot{y} + \left(\frac{\mu}{r_t^3} - \frac{h^2}{r_t^4}\right)\delta y - \left(\frac{2e^\top r_t^\top r_t}{r_t^4}h\right)\delta x + \left(\frac{2h}{r_t^2}\right)\delta\dot{x} = \frac{u_2}{m_c},$$

$$\delta\ddot{z} + \left(\frac{\mu}{r_t^3}\right)\delta z = \frac{u_3}{m_c},$$

where $r_t = \|r_t\|$, $h = \|r_t \times {}^e\dot{r}_t\|$ is the inertial specific angular momentum of the target's orbit, and $f_c = [u_1 \ u_2 \ u_3]^T$ is the control input applied to the chaser.

Still referring to FIG. 2, the linear time-varying equations of motion (7) are written in state-space form as $$\dot{x}(t) = A(t)x(t) + Bu(t), \tag{8}$$

where $x = [\delta x \ \delta y \ \delta z \ \delta\dot{x} \ \delta\dot{y} \ \delta\dot{z}]^T$, and $u = f_c$. For simplifying computations, we consider a discrete time formulation of (8) obtained by sampling with period $\Delta t$, $$x_{t+1} = f(t, x_t, u_t) = A_d(t)x_t + B_d(t)u_t, \tag{9}$$

Still referring to FIG. 2, the homogeneous solution of (9), i.e., $u_t = 0$ for all t, will be used in the next section to compute backwards reachable sets for passive safety.

REACHABLE SETS AND PASSIVE SAFETY: For passive safety, we compute backward reachable sets (BRS) under no control input, $u_t = 0$ for all t, of a final ellipsoidal set. Given a target set $\mathcal{S}_f$ and a target time $t_f$, the backward reachable set under no control action from $t_j \leq t_f$ to $t_f$ is defined by $$\mathcal{R}_b(t_f; \mathcal{S}_f, t_f) = \mathcal{S}_f \tag{10A}$$

$$\mathcal{R}_b(t_{j-1}; \mathcal{S}_f, t_f) = \{x \in \mathbb{R}^n : f(t_{j-1}, x, 0) \in \mathcal{R}_b(t_j; \mathcal{S}_f, t_f)\}, \tag{10b}$$

where $\mathcal{R}_b(t_j; \mathcal{S}_f, t_f)$ describes the set of all the states at $t_j$ that end up in $\mathcal{S}_j$ at $t_j$ without any control. We define the backwards reachable set over a time interval (BRSI) as the union of all BRS in the time-interval $[t, t_f]$ $$\tilde{\mathcal{R}}_{[t,t_f]}(t_j; S_f, t_f) = \bigcup_{\tau=t}^{t_f} \mathcal{R}_b(\tau; S_f, t_f), \qquad (11)$$

Ellipsoidal Set Representations: The target set $\mathcal{S}_j$ is considered to be represented by ellipsoids. An ellipsoid centered at $d \in \mathbb{R}^n$ with shape matrix D, $$\mathbb{R}(d,D) \mathbb{R} \{x \in \mathbb{R}^n : (x-d)^T D^{-1}(x-d) \leq 1\}, \qquad (12)$$

Still referring to FIG. 2, ellipsoids are closed under affine transformations. Given
$\mathbb{R}(d,D)$, $A \in \mathbb{R}^{n \times n}$ and $b \in \mathbb{R}^{n \times 1}$ $$A \mathbb{R}(d,D) + b = \mathbb{R}(Ad+b, ADA^T). \qquad (13)$$

The AE and KOE are ellipsoids centered at d=0, with shape matrix inverse P at time $t_f$, such that $$\mathcal{S}_f = \{x \in \mathbb{R}^6, x^T P x \leq 1\}, \qquad (14)$$

where the shape matrix inverses for the AE and KOE are $P = \{P_{AE}, P_{KOE}\}$.

Since $\mathcal{S}_f$ are ellipsoids and the discrete-time dynamics (9) are linear time-varying, with u(t)=0, the BRS (10) are also ellipsoids. In fact, given the ellipsoidal final set (14) and defining for the sake of simplicity the $t_j$-to-$t_h$ state transition matrix (i.e. even if not stated explicitly, matrices with larger step indices are added to the left, as matrix product is not commutative), $\Phi(t_h, t_j) = \Pi_{i=j}^{h} A_d(t_i)$, the BRS is $$\mathcal{R}(t_k; P, t_f) = \{x \in \mathbb{R}^n : x^T \Phi(t_f, t_k)^T P \Phi(t_f, t_k) x \leq 1\}. \qquad (15)$$

Union of BRSI: Given the ellipsoidal final set (14), defined by a shape matrix inverse P, the N-step BRSI is defined as $$\tilde{\mathcal{R}}_{[t_f-N, t_f]}(t_f - N; P, t_f) = \bigcup_{t_i=t_f-N}^{t_f} \{x \in \mathbb{R}^n : x^T \Phi(t_f, t_i)^T P \Phi(t_f, t_i) x \leq 1\}, \qquad (16)$$

Still referring to FIG. 2, the BRSI (16) is not an ellipsoid, but it is the union of a finite set of ellipsoids.

As we deal with a non-circular orbit, various final times and states need to be considered. The orbital mechanics of the target are used to sweep the target set across the orbit. Computing the N-step BRSI at different $r_t$ results in a discrete-time representation (i.e. All discrete time representations of BRS and BRSI are in fact approximations for the actual system behavior that is continuous-time, yet some approximations are necessary for the case of time varying systems [23]. However, these approximations can be made sufficiently accurate by an appropriate choice of the sampling period $\Delta t$), of the N-step BRSI of the LTV system. The approximation of the full LTV BRSI is obtained by taking the union of such sets, $$\tilde{\mathcal{R}}(t_k; P, t_f) = \bigcup_{t_f=t_p+1}^{2t_p} \bigcup_{t_k=t_f-N}^{t_f} \{x \in \mathbb{R}^n : x^T \Phi(t_f, t_k)^T P \Phi(t_f, t_k) x \leq 1\}, \qquad (17)$$

where $t_p$ is the orbital period of the target and we have assumed $N\Delta t \ll t_p$. The union operator on the left ensures the target state is evaluated at discrete points along an orbital period, yielding a set of final states $$X_f = \{x(t_f), x(t_f + \Delta T), \ldots, x(t_f + t_p)\}, \qquad (18)$$

which is equivalent to evaluating $r_t$, $\bar{r}_t$ different true anomalies $\theta \in [0, 2\pi]$, since $t \propto \theta$. The BRSI (17) ensures safety for a time horizon N from the current time.

Passive Safety: Passive safety ensures that with natural free-drift dynamics, the chaser spacecraft does not intersect the AE or KOE in the event of total control loss. Safety is defined only by the relative position; the velocity at which the chaser spacecraft enters the AE or KOE is immaterial. As such, the shape matrix $P^{-1}$ is defined as a degenerate ellipsoid with unbounded velocity minor/major axes. Thus, $P_{\{AE,KOE\}}$ is a rank deficient shape inverse matrix $$P_{\{AE,KOE\}} = \begin{bmatrix} P_p & 0_{3 \times 3} \\ 0_{3 \times 3} & 0_{3 \times 3} \end{bmatrix} \in \mathbb{R}^{6 \times 6}. \qquad (19)$$

Still referring to FIG. 2, the only difference between $P_{AE}$ and $P_{KOE}$ is the block matrix $P_p$. Matrix (19) is used to constrain the positions on a 3D ellipsoid, while leaving the velocities unconstrained. When (19) is used in the BRSI computations, the resulting set represents all possible positions and velocities that enter the target set in some time-horizon. All of the resulting BRS are also (degenerate) ellipsoids.

Thus, given a union of BRSI, computed with (17), passive safety can be achieved by remaining in the safe set, $x \in X_{safe}$, where $$\mathcal{X}_{safe} = \tilde{\mathcal{R}}(t_k; P, t_f)^c; \qquad (20)$$

is the complement of the LTV BRSI (17). Clearly, enforcing the safe set directly as a constraint in an MPC problem, results in a non-convex optimization problem. In this work, entering $\tilde{\mathcal{R}}(t_k; P, t_f)$ is avoided by using hyperplanes near the exterior surface of the LTV BRSI. The hyperplanes are then used as linear constraints in an MPC policy which maintains the chaser spacecraft inside the safe set, i.e., $$x \in \mathcal{X}_{safe}, \forall t. \qquad (21)$$

FAIL SAFE RENDEZVOUS CONTROL: Next, we develop a fail-safe MPC policy that exploits the LTV BRSI (17). In particular, the MPC will use constraints to maintain the trajectory outside the BRSI while minimizing an appropriate cost function, for instance to reduce fuel consumption. As noted above, the MPC policy can be referred to as a fail-safe MPC policy, a fail-safe control policy, throughout the disclosure.

Constraints: In this work the MPC policy only enforces constraints that ensure passive safety. Additional constraints, e.g., on the control inputs, are straightforward to include. The constraints enforcing LTV BRSI (17) avoidance are non-convex, since they require avoiding a union of ellipsoids, i.e., $x \notin \tilde{\mathcal{R}}(t; P, t_f)$. This significantly complicates the finite-horizon MPC optimal control problem. In fact, even the avoidance of each ellipsoid is described by non-convex constraints, $$x^T P_f x \geq 1. \qquad (22)$$

Thus, here we implement a local convexification approach, based on computing a tangent to the constraints in the form of (22), and then enforcing half-space constraints to ensure that $x \in \mathcal{X}_{safe}$.

Figure 3:
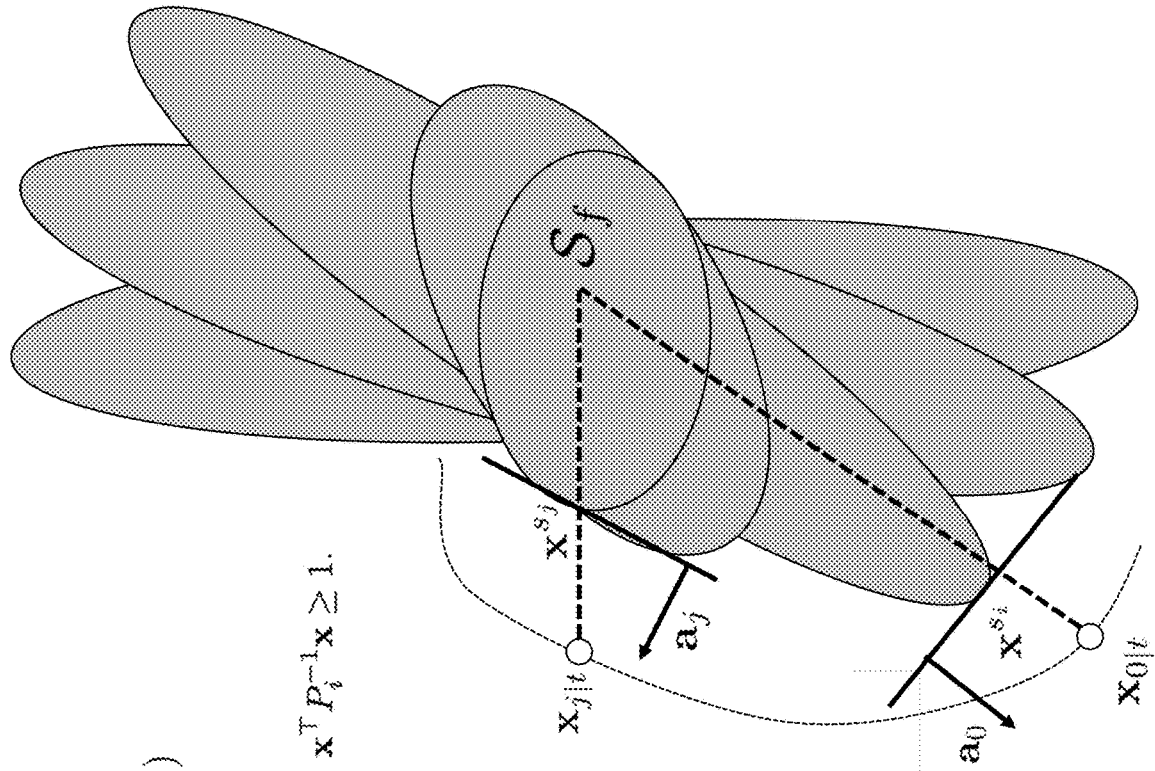
FIG. 3 is a schematic illustrating how to enforce the passive safety, according to some embodiments of the present disclosure.

FIG. 3 is a schematic illustrating how to use local convexification to formulate the passive safety constraints, according to some embodiments of the present disclosure. The following describes how the local convexification method works.

The tangent hyperplanes are computed by projecting the state x radially onto the ellipsoids. The radial distance from the state to the surface of the ellipsoid $\mathcal{E}_i$ is $$\rho = x^T P_i x. \tag{23}$$

Still referring to FIG. 3, normalizing the state x by $\rho$, results in the closest state on the ellipsoid surface $$x^{S_i} = \frac{x}{\rho}. \tag{24}$$

Still Tangent hyperplane to the ellipsoid surface at $x^{S_i}$ is defined by the normal vector $$a_i = 2P_i x^{S_i}, \tag{25}$$

since $P_i = P_i^T$, so that the tangent hyperplane is $$\{x \in \mathbb{R}^6 : a_i^T x = a_i^T x^{S_i} = b^i\}. \tag{26}$$

Still referring to FIG. 3, given a state x at time t, we compute projections $x^{S_i}$ for all ellipsoids $\mathcal{E}_i \in \bar{\mathcal{R}}(t; P, t_f)$. Due to the possibly constraints for all of them, we only enforce the one that seems to be more conservative, i.e., the one that is most exterior to the center of the ellipsoids, in our case the origin, by selecting i such that $$x^{S_i*} = \arg\max_i \|x^{S_i}\|, \tag{27}$$

Still referring to FIG. 3, in the MPC policy, the hyperplanes are computed based on the previously predicted state trajectory. Let $(x_{0|t-1} \ldots x_{N|t-1})$ be the trajectory computed at time $t-1$, where $x_{k|t}$ denotes x predicted k steps ahead from t. Then, we can compute $a_{k|t}$, $b_{k|t}$ from (24), (25) using $x_{k+1|t-1}$ as prediction for $x_{k|t}$.

$$-a_{k|t}^T x_{k|t} + b_{k|t} \le s_{k|t}, \quad k=1 \ldots, N \tag{28}$$

where N is the prediction horizon, and $s_k \ge 0$ is a slack variable softening constraints (28) to avoid infeasibility. For shortness we write (28) as $$g_t(x_{k|t}, u_{k|t}, s_{k|t}) \le 0. \tag{29}$$

Cost Function: The cost function of the MPC problem consists of a stage cost integrated along the prediction horizon and a terminal cost on the state at the end of the horizon, which encode the MPC control objectives. At least one objective for the embodiments of the present disclosure is for the rendezvous to occur, which amounts to the chaser spacecraft reaching and staying at the origin of the target orbital frame, i.e., reaching zero position and velocity. An additional objective is to minimize the total required propellant, since this allows for the increase of payload mass. This objective is encoded into the MPC policy by minimizing the thrust, u, of the propulsion system. Finally, as the constraints derived from the LTV BRSI are softened, another objective of the controller is to minimize the safety constraint violations. Indeed, the safety and approach objectives are conflicting, resulting in trade-offs in the optimal solutions.

Still referring to FIG. 3, in the stage cost is given by $$F(x,u,s) = x^T Q x + u^T R u + \omega_s s^2, \tag{30}$$

where, $Q = Q^T \ge 0$, $R = R^T > 0$, $\omega_s >> 0$.

The terminal cost is positive definite and quadratic. It encodes a penalty for not being at the desired zero-state by the end of the MPC window.

$$E(x) = x^T M x; \tag{31}$$

where $M = M^T \ge 0$.

Optimal Control Problem:

The MPC policy is based on solving a receding horizon optimal control problem of the following form $$\min_{U(t), s_t} E(x_{N|t}) + \sum_{k=0}^{N-1} F(x_{k|t}, u_{k|t}, s_{k|t}) \tag{32}$$

$$\text{s.t. } x_{k+1|t} = A_d(t+k) x_{k|t} + B_d u_{k|t}$$

$$x_{0|t} = x(t)$$

$$g_t(x_{k|t}, u_{k|t}, s_{k|t}) \le 0$$

where the prediction model for the MPC policy is given by (9), $s_t = (s_{0|t} \ldots s_{N-1|t})$ and $U(t) = (u_{0|t} \ldots u_{N-1|t})$. The resulting control policy is of the form, $$u(t) = k_{mpc}(x(t)) = u_{0|t}^*, \tag{33}$$

where U* is the optimal solution of (32).

FIG. 4 is illustrating an algorithm associated with fail-safe rendezvous control, according to some embodiments of the present disclosure.

Algorithm of FIG. 4 Overview: As mentioned earlier, the proposed approach is staged into three mission phases.

1) Phase 1: passive safety with respect to the AE.
2) Phase 2: passive safety with respect to the KOE.
3) Phase 3: no safety, final approach.

A summary of the fail-safe rendezvous control is found in Algorithm 1 of FIG. 4. Offline, the AE and KOE BRSI are computed using (17). The AE and KOE phases are implemented identically, the difference being in which LTV BRSI is used. Once the AE or KOE phase are started, the predicted states in the MPC are projected onto all ellipsoids in the respective LTV BRSI. The hyperplanes furthest from the origin are selected and enforced as constraints in the MPC. The hyperplanes are computed at each MPC step, as shown in lines 3-4 of Algorithm 1 of FIG. 4. This ensures the right hyperplanes along the LTV BRSI boundary are used at each time-step. Then, the optimal control problem (32) is solved, and the initial control step is applied to the spacecraft. Phase changes are triggered when the current state x(t) enters a bounding $\mathcal{X}_{box_{\{AE,KOE\}}}$ around the AE or KOE, given by $$\mathcal{X}_{box_{\{AE,KOE\}}} = \left\{ x \in \mathbb{R}^6 : Hx \le \begin{bmatrix} x_{lim} \\ x_{lim} \end{bmatrix}_{\{AE,KOE\}} \right\} \tag{34}$$

where, $$H = \begin{bmatrix} I_{3\times3} & 0_{3\times3} \\ -I_{3\times3} & 0_{3\times3} \end{bmatrix} \in \mathbb{R}^{6\times6}. \tag{35}$$

Still referring to FIG. 4, after the current state enters the KOE bounding box, an unconstrained $w_s = 0$ version of the optimal control problem (32) is solved to converge towards the target.

Algorithm 1 Fail-safe Rendezvous Control

Offline: Compute full AE and KOE LTV BRSI (17)
AE & KOE Approach
1:    input: x(t)
2:    repeat -continued

| | Algorithm 1 Fail-safe Rendezvous Control |
|---|---|
| 3: | Project xklt on all ellipsoids $\mathcal{E}_i \in \tilde{\mathcal{R}}(t; P, t_f) \; \forall k$ (24) |
| 4: | Select furthest hyperplanes from origin (27) $\forall k$ |
| 5: | Solve optimal control problem (32) |
| 6: | Apply control policy (33) to the chaser spacecraft |
| 7: | until Spacecraft enters AE or KOE bounding Box (34) Final Approach |
| 8: | Input: x(t) |
| 9: | repeat |
| 10: | Solve optimal control problem (32) |
| 11: | Apply control policy (33) to the chaser spacecraft |
| 12: | until Converged to the target |

EXPERIMENTAL OR SIMULATION RESULTS: To demonstrate the effectiveness of Algorithm 1 of FIG. 4, three case studies are presented.

The control performance are measured by total change in velocity as it is independent of satellite mass and thruster efficiency. The total $\Delta V$ of a maneuver is given by $$\Delta V = \sum_{i=0}^{N-1} \|Bu_i\| \cdot \Delta t.$$

Still referring to FIG. 4, the target in Earth-orbit with classical orbital elements is considered given by $$[a,e,i,\omega,\Omega,f]^T = [7420 \text{ km}, 0.1°, 0.01°, 0°, 0°]^T.$$

The resulting orbital period of the target body is $t_p = 106.02$ min=6361.2 s. We define an AE around the target of size [1 2 1] kin in the radial, along-track, and out-of-plane directions, and KOE of size [100 200 100]m. The mass of the chaser spacecraft is $m_c = 4000$ Kg.

The number of steps in the MPC horizon, the sampling period, the safety horizon, and the LTV BRSI (17) inflation factor are $N_T = 30$, $\Delta t = 30$s, $t_H = 2t_p$, and $\rho = 1.3$, respectively. All phases share the same state and control penalties in the stage cost, namely, $Q = I_6$, $R = 1.3 \cdot 10^4 I_3$. The terminal cost weight is $M = 10^2 I_6$. The slack variable penalty is $\omega_s 10^6$ in the AE and KOE phases and $w_s = 0$ in the final approach phase.

In the following figures, the initial condition is represented by a green asterisk, the blue trajectory is the relative position of the chaser with respect to the target, as seen in the target's orbital frame $F_t$, and the black lines are sampled free-drift trajectories propagated forward without control to verify passive safety. We color the sampled free-drift trajectories red if they intersect either the AE or the KOE.

Figure 5:
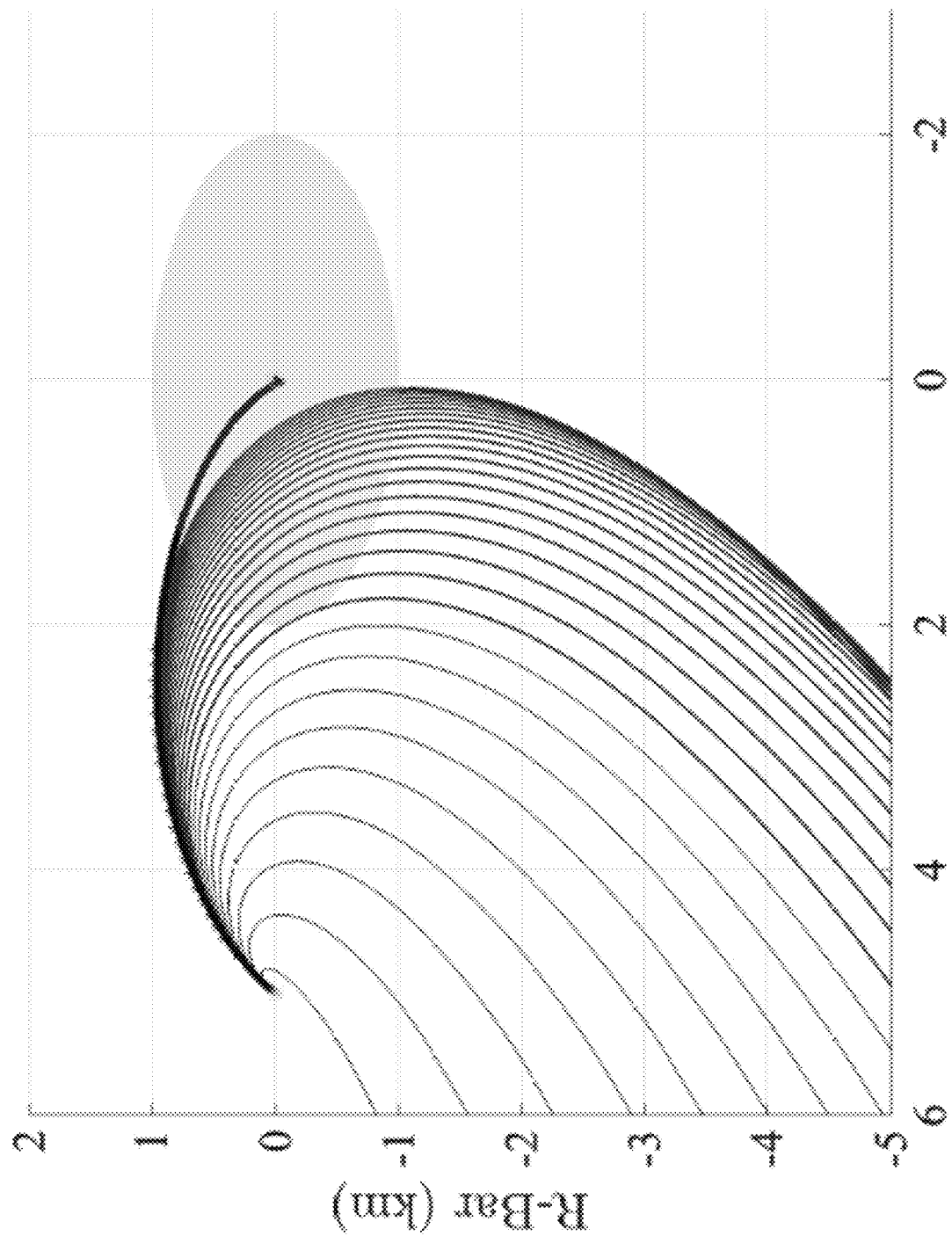
FIG. 5 is a graph illustrating a V-Bar unsafe AE approach, according to some embodiments of the present disclosure.

V-Bar Approach:

FIG. 5 is a graph illustrating a V-Bar unsafe AE approach, according to some embodiments of the present disclosure. For example, an initial state $x(0)=[0 4 0 0 0 0]^T$ is selected. As a baseline, we apply the MPC policy (33) with $w_s=0$, that is, we do not enforce the passive safety constraints. The resulting maneuver is shown in FIG. 4 and requires $\Delta V_{unsafe}=13.3631$ m/s. The spacecraft enters the AE LTV BRSI prior to reaching $\mathcal{X}_{box,AE}$, and thus, sampled free-drift trajectories along the nominal rendezvous maneuver intersect the AE and are unsafe (shown in red). Setting $w_s=10^6$, we rerun the simulation and the resulting maneuver is shown in FIG. 5, requiring $\Delta V_{safe}=20.5816$ m/s.

Figure 6:
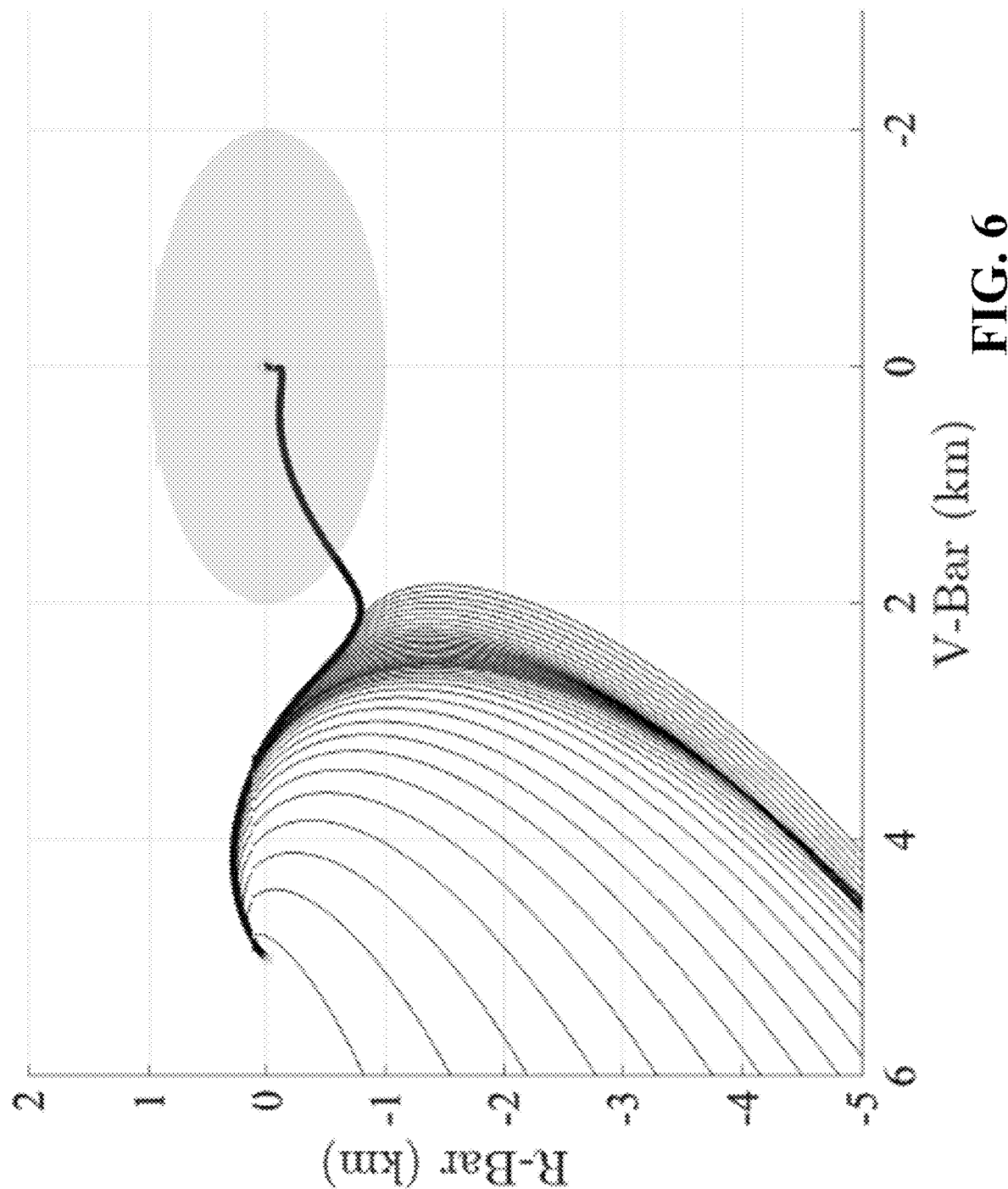
FIG. 6 is a graph illustrating a V-Bar safe AE approach, according to some embodiments of the present disclosure.

FIG. 6 is a graph illustrating a V-Bar safe AE approach, according to some embodiments of the present disclosure. The rendezvous maneuver is clearly modified due to the passive safety constraints, resulting in a passively safe trajectory towards the AE.

Figure 7:
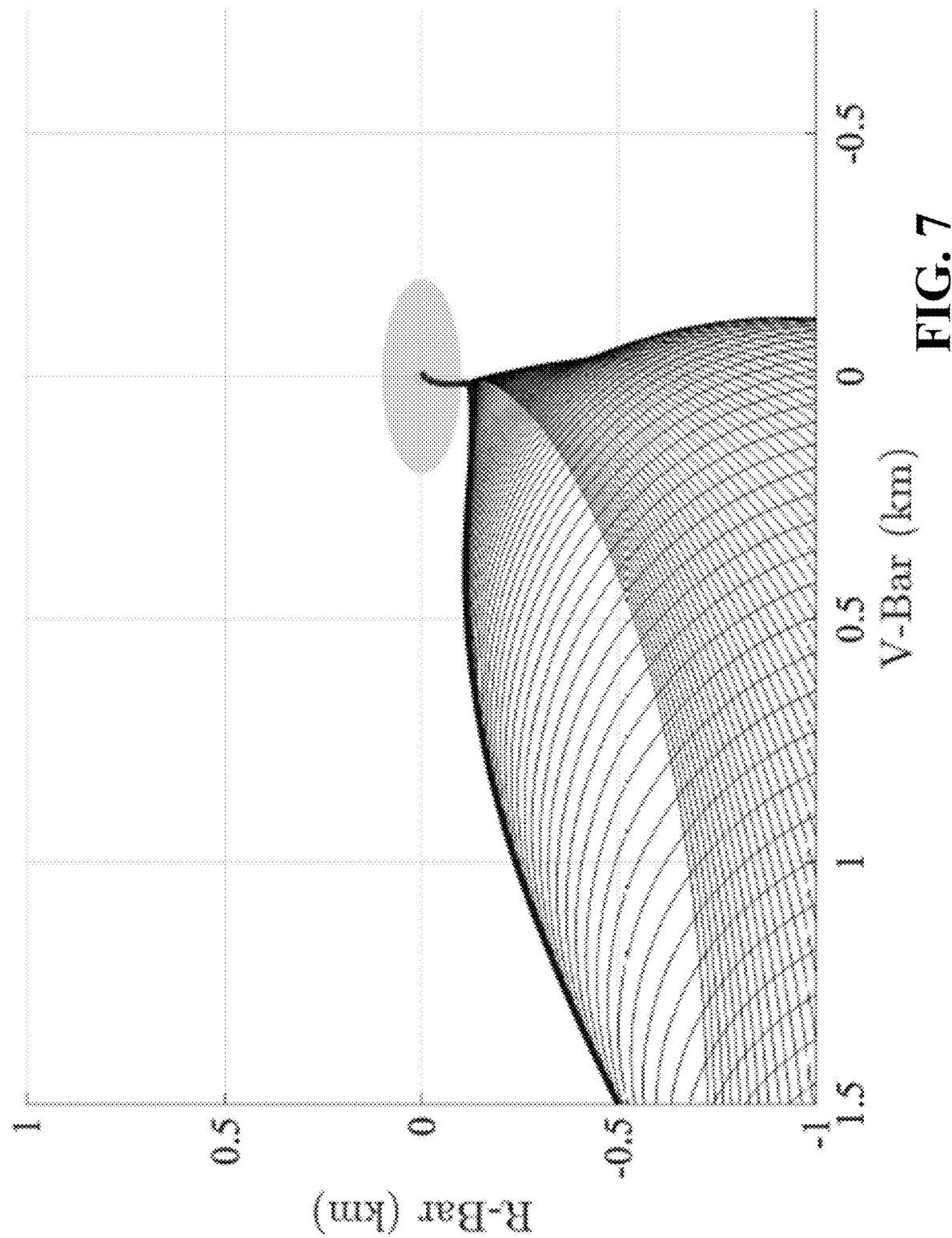
FIG. 7 is a graph illustrating a V-Bar safe KOE approach, according to some embodiments of the present disclosure.

FIG. 7 is a graph illustrating a V-Bar safe KOE approach, according to some embodiments of the present disclosure. Once the chaser enters $\mathcal{X}_{box,AE}$, the maneuver proceeds towards the target while maintaining passive safety with respect to the KOE. The resulting maneuver is shown in FIG. 4.

Figure 8:
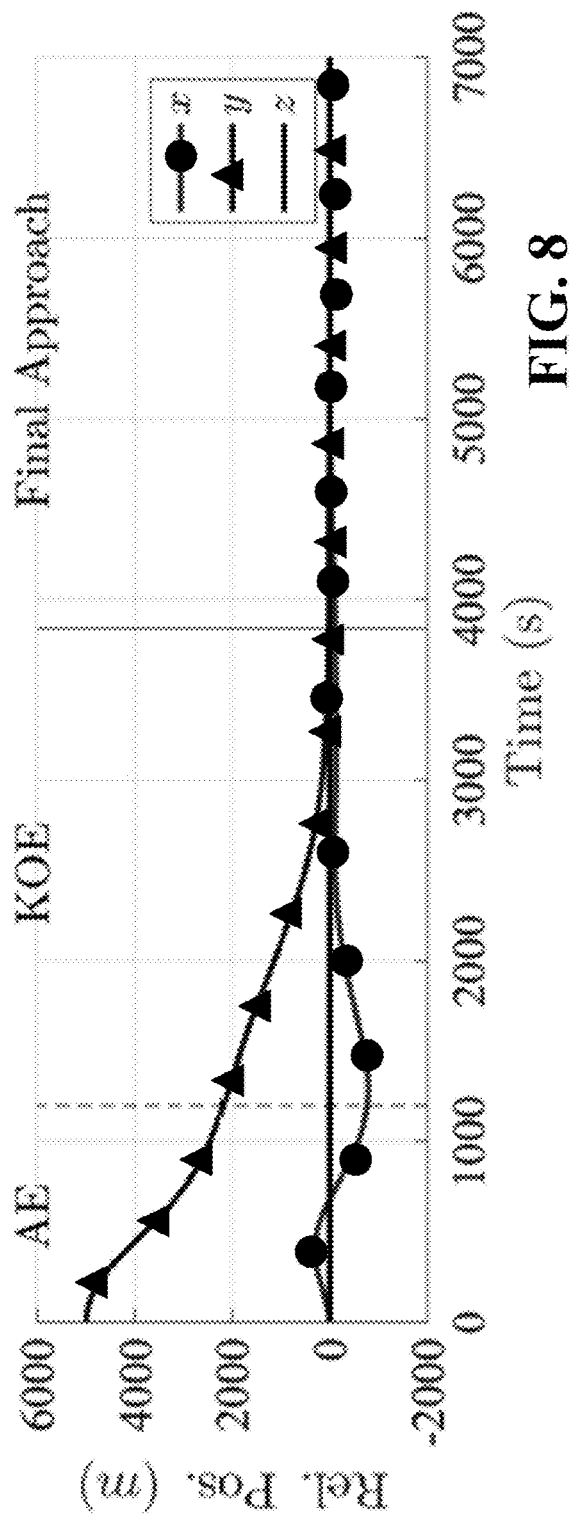
FIG. 8 is a graph illustrating a V-Bar safe KOE approach relative positions, according to some embodiments of the present disclosure.

FIG. 8 is a graph illustrating a V-Bar safe KOE approach relative positions, according to some embodiments of the present disclosure. Wherein, $\dot{x}$ is illustrated with a line having a circle along the line, $\dot{y}$ is illustrated with a line having a triangle along the line, z is illustrated having a solid line.

Figure 9:
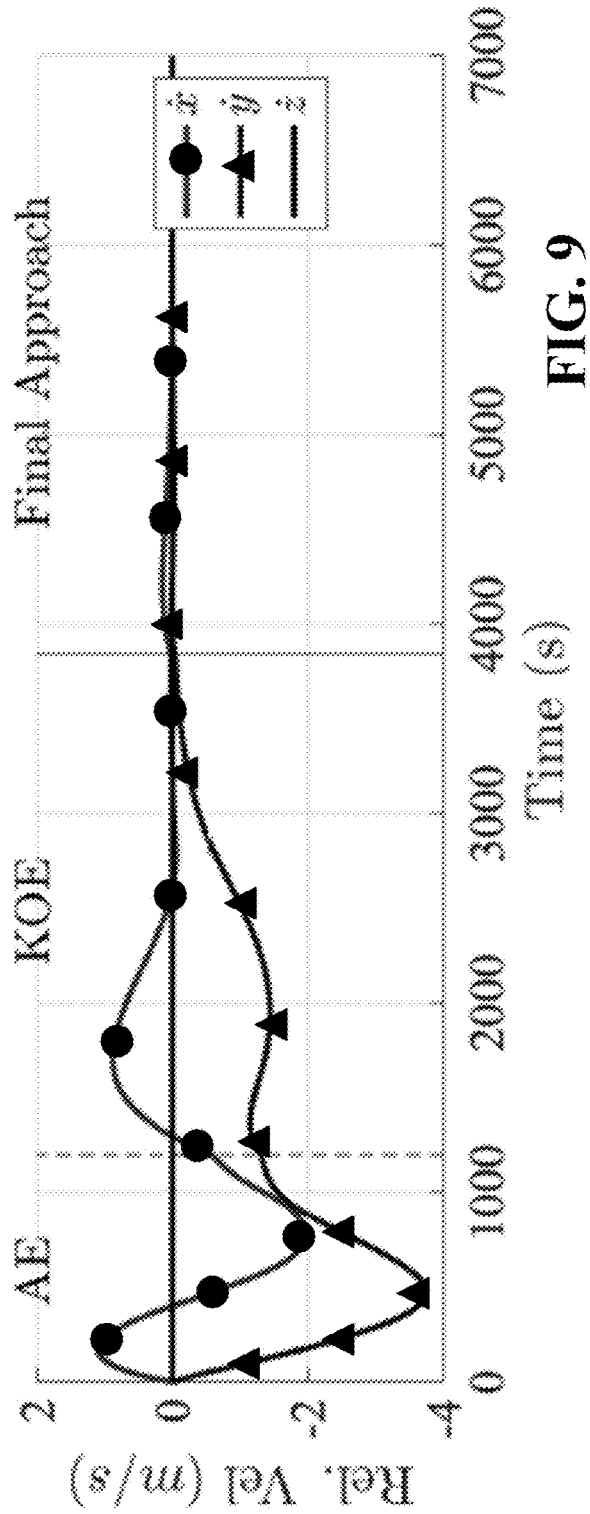
FIG. 9 is a graph illustrating a V-Bar safe KOE approach relative velocities, according to some embodiments of the present disclosure.

FIG. 9 is a graph illustrating a V-Bar safe KOE approach relative velocities, according to some embodiments of the present disclosure. Wherein, $\dot{x}$ is illustrated with a line having a circle along the line, $\dot{y}$ is illustrated with a line having a triangle along the line, $\dot{z}$ is illustrated having a solid line.

Figure 10:
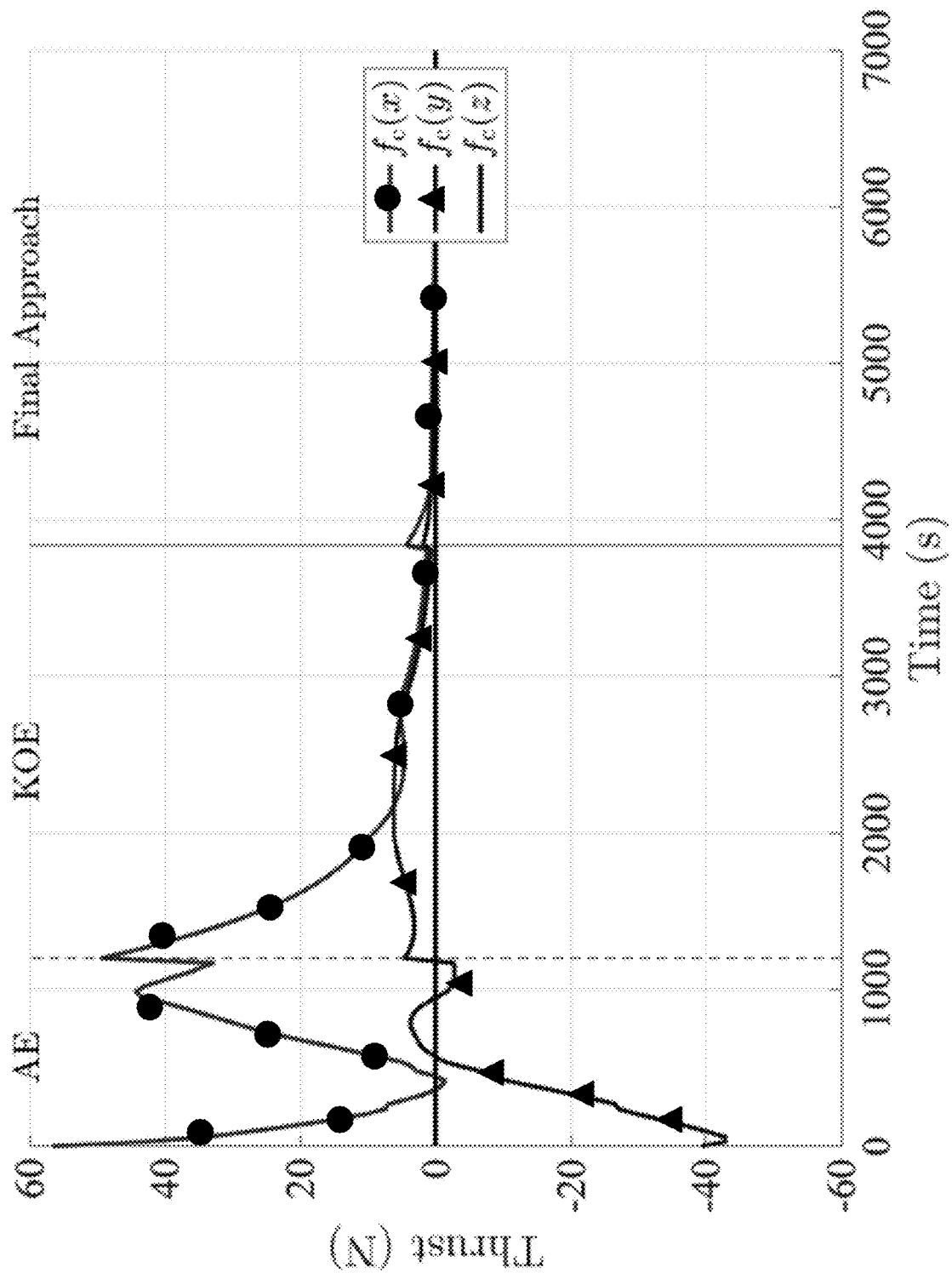
FIG. 10 is a graph illustrating a V-Bar safe approach control, according to some embodiments of the present disclosure.

FIG. 10 is a graph illustrating a V-Bar safe approach control, according to some embodiments of the present disclosure. Wherein, $f_c(x)$ is illustrated with a line having a circle along the line, $f_c(y)$ is illustrated with a line having a triangle along the line, $f_c(z)$ is illustrated having a solid line.

Referring to FIG. 9 and FIG. 10, are graphs illustrating show time histories of the relative position and velocity of the chaser, the control forces, and a test of whether or not the current state is inside the LTV BRSI associated with the AE or the KOE. Phase switches between maintaining passive safety with respect to the AE, KOE, and the final approach phase are marked by vertical dotted black lines. The fail-safe control policy of Algorithm 1 of FIG. 3 almost immediately guides the spacecraft outside of the LTV BRSI in order to maintain passive safety.

R-Bar Approach: Next, the initial state $x(0)=[-5 0 0 0 0 0]^T$ is selected. Again, passive safety is maintained in both the AE and KOE phases of the rendezvous simulation.

Figure 11:
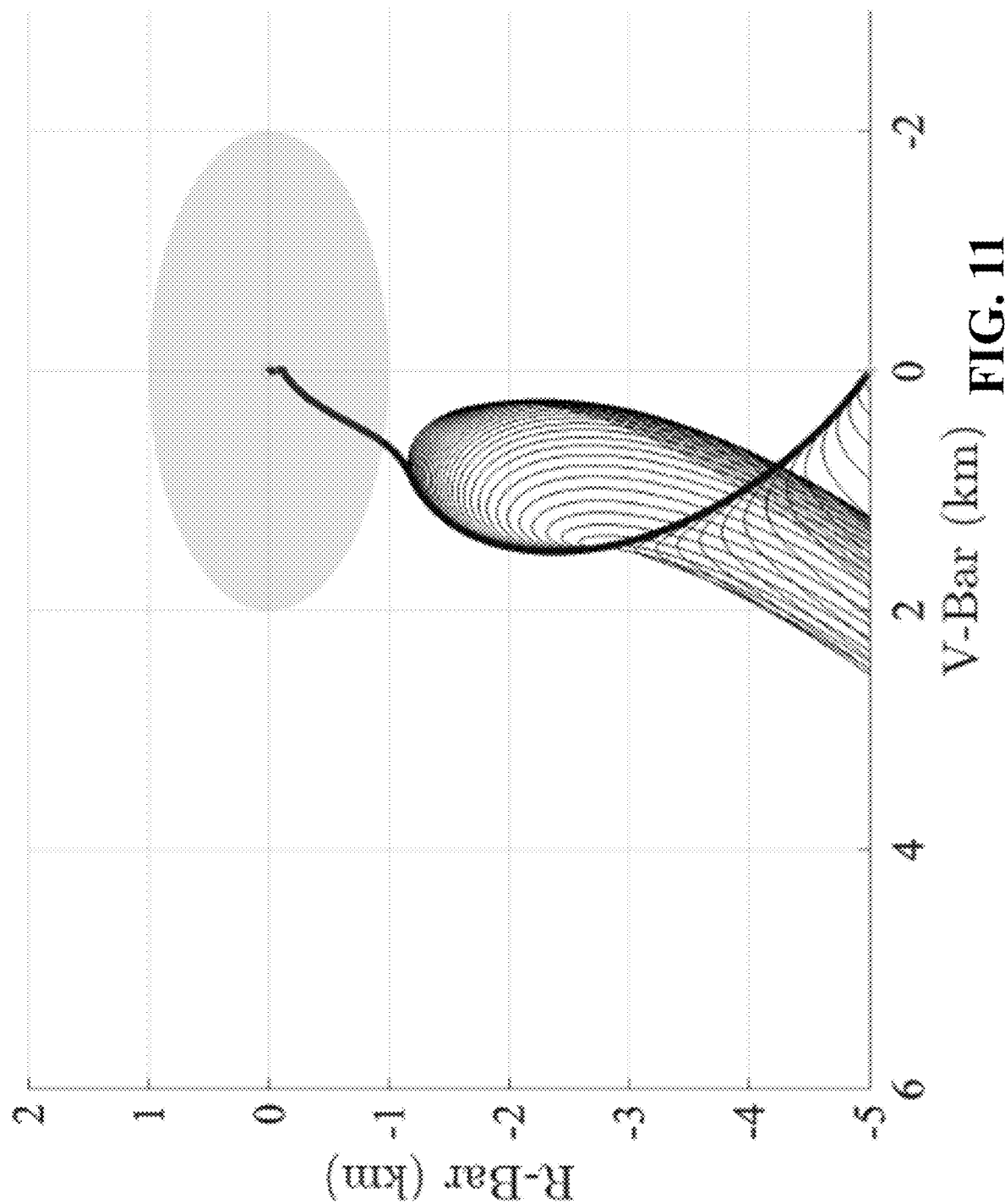
FIG. 11 is a graph illustrating a R-Bar safe AE approach, according to some embodiments of the present disclosure.

FIG. 11 is a graph illustrating a R-Bar safe AE approach, according to some embodiments of the present disclosure.

Figure 12:
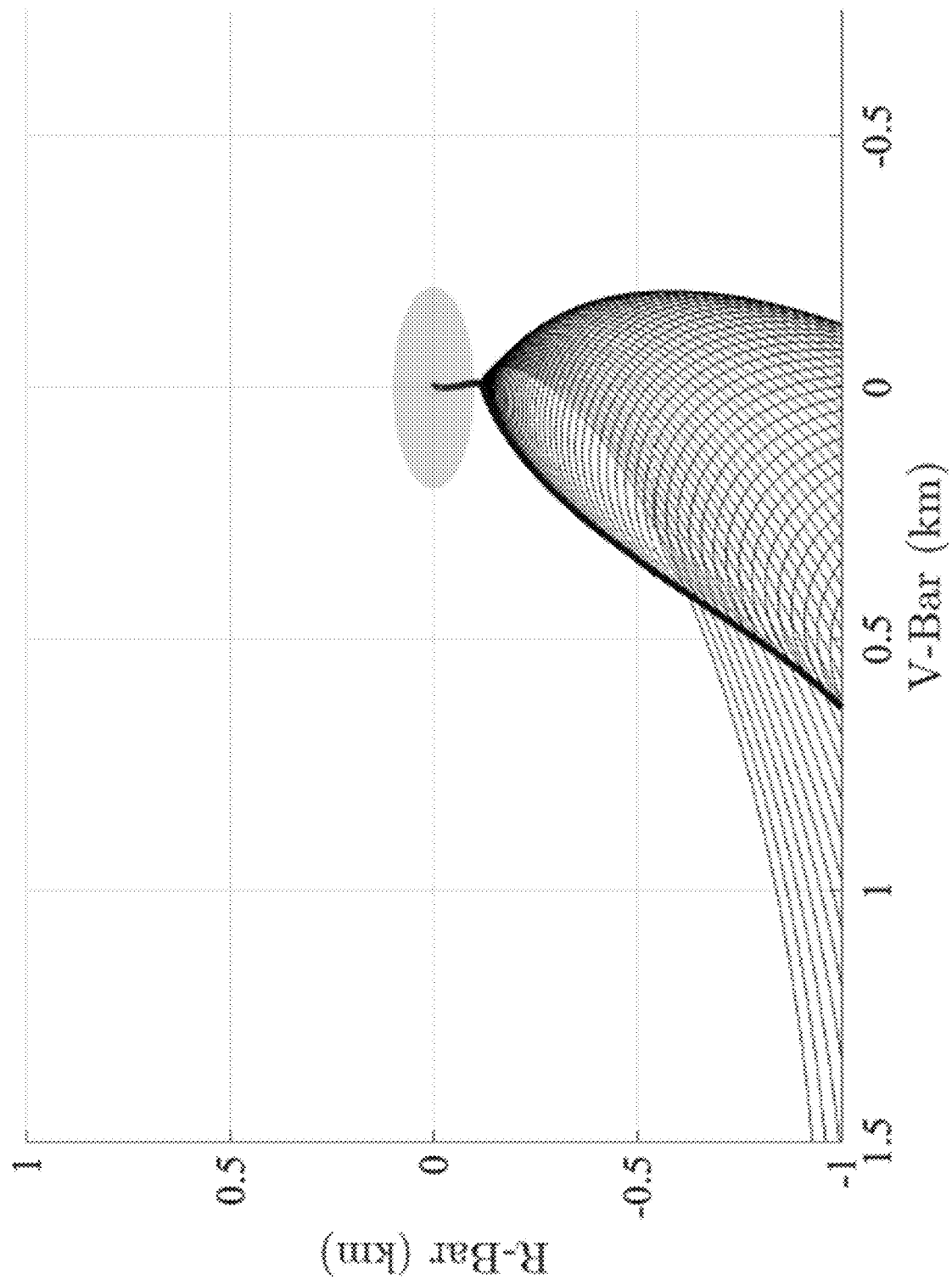
FIG. 12 is a graph illustrating a R-Bar safe KOE approach, according to some embodiments of the present disclosure.

FIG. 12 is a graph illustrating a R-Bar safe KOE approach, according to some embodiments of the present disclosure.

Referring to FIG. 11 and FIG. 12, no sampled free-drift trajectories intersect the AE or KOE, as visible in FIG. 10 and FIG. 11. For this initial condition, the unsafe approach (not shown) consumes $\Delta V_{unsafe}=27.3216$ m/s, while the safe approach requires $\Delta V_{safe}=30.0941$ m/s.

Three-Dimensional Approach: Finally, we select the initial state $x(0)=[-5 -5 0.2 0 0 0]^T$ in order to demonstrate the flexibility of the proposed algorithm, which can obtain passively safe trajectories with non-traditional initial conditions.

Figure 13:
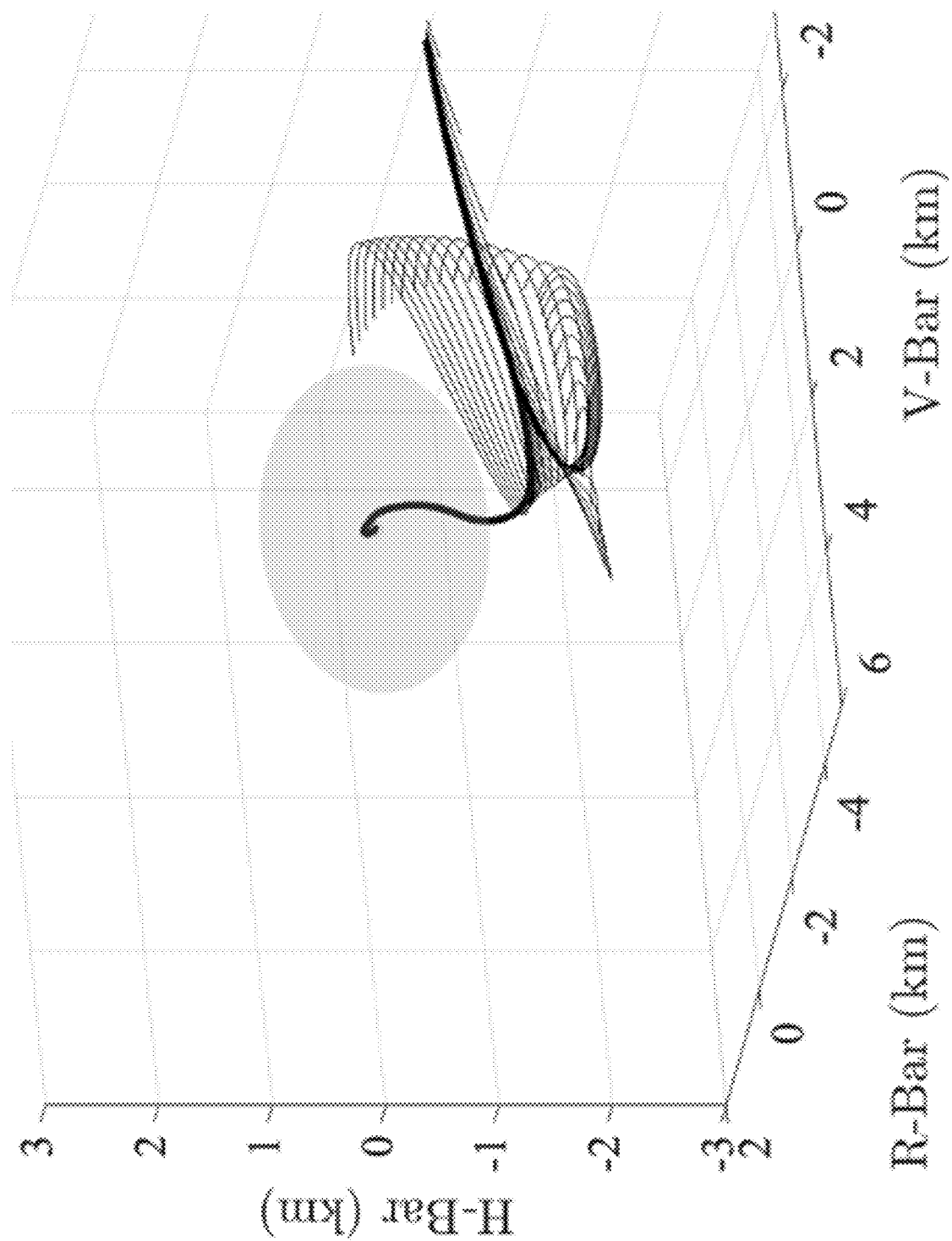
FIG. 13 is a graph illustrating a 3D safe AE approach, according to some embodiments of the present disclosure.

FIG. 13 is a graph illustrating a 3D safe AE approach, according to some embodiments of the present disclosure. As before, passive safety is maintained in both the AE and KOE phases of the rendezvous simulation, no sampled free-drift trajectories intersect the AE or KOE (not shown).

The unsafe approach consumes $\Delta V_{unsafe}=22.2205$ m/s, while the safe approach requires $\Delta V_{safe}=28.7021$ m/s. The safe approach is clearly modified by the safety constraints to avoid entering the AE LTV BRSI. One of the benefits of the proposed approach is that unconventional maneuvers from non-traditional initial rendezvous conditions can be generated online in a passively safe manner.

Some embodiments of the present disclosure provide for a fail-safe control policy for rendezvous on generic elliptic orbits using backwards reachable sets and model predictive control. The proposed control policy is able to satisfy passive safety constraints that, in the event of total thruster failure, keep a chaser spacecraft from colliding with a rendezvous target.

Features

According to aspects of the present disclosure, a system for controlling an operation of a vehicle to rendezvous the vehicle with a target over a finite time horizon. The system including a transceiver accepts data including values of vehicle states and the target states in a multi-object celestial system at a specified time period within the finite time horizon. A processor to access a memory having stored passive unsafe regions, and select a set of passive unsafe regions corresponding to an orbit the target is located at the specified time period. Wherein the set of passive unsafe regions represents regions of space around the target guaranteeing collision trajectories with the target, in an event of total spacecraft thruster failure within the specified time period. Formulate the set of passive unsafe regions as passive safety constraints. Update a controller having a model of dynamics of the vehicle with the accepted data, and subject the updated controller to the passive safety constraints to generate control commands that produce a collision free rendezvous trajectory which avoids set of passive unsafe regions for the specified time period, guaranteeing a collision free trajectory with respect to the target in the event of the total vehicle thruster failure, so the vehicle does not collide with the target. Output the control commands to activate or not activate one or more thrusters of the vehicle for the specified time period based on the control commands. Wherein one or more of the following aspects below are contemplated as configuring one or more modified embodiments of the above embodiment.

Another aspect of the present disclosure can include the multi-object celestial system includes a celestial reference system or celestial coordinate system, that includes positions of the vehicle such as a spacecraft, the target and other celestial objects in a three-dimensional space, or plot a direction on a celestial sphere, if an object's distance is unknown. An aspect can be the celestial objects include a primary body such as Earth around which the target orbits, or a primary body such as Earth and a secondary body such as a Moon, so that the target is in a halo orbit, a periodic three-dimensional orbit near one of a L1 Lagrange point, L2 Lagrange points or L3 Lagrange points. Another aspect can be a region around the spacecraft, the celestial body and the orbital debris is one of an approach ellipsoid (AE) region or a keep-out sphere (KOS) region, or a region around the spacecraft, the celestial body and the orbital debris is one of an approach polytope (AP) region or a keep-out polytope (KOP) region.

Another aspect can be the target orbit is one of circular orbits, elliptic orbits, halo orbits, near rectilinear halo orbits or quasi-satellite orbit. Yet another aspect is that to access the passive unsafe regions from the memory, the processor identifies the orbit the target is located at the specified time period from the accepted data, accesses a passive unsafe region (PUR) database from the memory, and using the target orbit identifies a corresponding set of PURs for the target orbit from the PUR database.

Another aspect is that the passive unsafe regions are determined by computing backwards reachable sets of the region around the target, such that the target is a spacecraft, a celestial body or orbital debris, and that the region around the spacecraft, the celestial body and the orbital debris is one of an approach ellipsoid (AE) region or a keep-out ellipsoid sphere (KOSE) region. Wherein an aspect is that the backwards reachable sets are computed backwards-in-time from the target region, as regions of state-space that passively drift under no control to the target region. Or an aspect is that the backwards reachable sets are one of ellipsoids, polytopes or zonotopes. Still an aspect can be the computations of the backwards reachable sets of the region around the target are performed offline and stored in memory. Further, an aspect is that the computations of the backwards reachable sets of the region around the target are performed online, and in real time based on an estimated position of the target from onboard sensor measurements on the vehicle and stored in memory. Or that as aspect is the target region is time-varying as the target moves along the target orbit such that the backwards reachable sets are computed for multiple target positions and target region positions along the target orbit.

Another aspect can be the controller is a model predictive controller (MPC). That an aspect is the MPC uses a local convexification of passive unsafe regions to formulate linear passive safety constraints that are only satisfied when a vehicle state is not inside the passive unsafe region. Such that an aspect is the local convexification of the passive unsafe regions is achieved by computing a half space constraint that approximates a passive unsafe region boundary. Wherein an aspect is the half space constraint is formulated as a chance constraint which requires that the half space constraint be satisfied with at least a priori specified probability level due to an uncertainty regarding a position of the vehicle or the target, and/or an uncertainty of a thruster magnitude or a direction.

Another aspect is the updated controller is subjected to the passive safety constraints by formulating an optimal control problem that includes the passive safety constraints so that when optimized over a set of admissible control inputs, an optimizer generates the control commands. An aspect is the control commands are generated as a solution to a model predictive control policy that produces the control commands by optimizing a cost function over a receding horizon. Another aspect is the control commands are generated for each specified time period of multiple specified time periods in the finite time horizon, or generated iteratively over a receding time-horizon. Wherein an aspect is the control commands are generated iteratively and wherein at least one iteration comprises: updating one or combination of the components of the cost function and weights of the components of the cost function and passive safety constraints based on a change of a desired operation of the spacecraft. Further and aspect is for each iteration at a next sequential specified time period, there are different passive unsafe regions.

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Unclaimed Claim set: An aspect wherein the passive unsafe regions are used to formulate passive safety constraints by using constraint functions that are only satisfied when a vehicle state is not inside the passive unsafe region. Another aspect wherein the control commands are generated as a solution to an optimal control problem. An aspect can include wherein the control commands are outputted to an operations module of the controller, such that the operations module communicates the control commands to a thruster command module that receives the control commands as delta v commands, and the thruster command module is to convert the delta v commands to thruster commands, and send the thruster commands to a thruster processor of at least one thruster, to activate or not activate the at least one thruster for trajectory-tracking control of the vehicle, according to the converted delta v commands. An aspect further comprising: a cost function associated with the controller including a stabilization component for directing a movement of the vehicle to a target state, a component for an objective of the operation of the spacecraft, and a performance component for optimizing the movement of the vehicle until the target state. An aspect further comprising: weighting each of the components of the cost function, such that the optimization of the cost function produces control inputs that achieve goals of each individual component with priority corresponding to their relative weight.

Boat Independent claim: A controller to control a vehicle to rendezvous the vehicle with a target in real time over a finite time horizon, wherein the vehicle and the target form a multi-object coordination system, and transceiver accepts data in real time including values of vehicle states and target states in the multi-object celestial system, at a specified time period within the finite time horizon, the controller comprising: a guidance and control computer (GCC) processor having an interface to pass information in real time related to a propulsion control system of the vehicle, the GCC processor at the specified time period is configured to identify an area the target is located in real time from the accepted data; access a memory having unsafe regions, and select a set of unsafe regions corresponding to the target area location from the stored unsafe regions, wherein the set of unsafe regions represents regions within the area around the target in which any operation of the predetermined combination of the number of operational motors does not avoid collision with the target, guaranteeing collision trajectories with the target; formulate the set of unsafe regions as safety constraints; update a controller having a model of dynamics of the vehicle with the accepted data; generate control commands by subjecting the updated controller to the safety constraints to produce a rendezvous trajectory that avoids the set of unsafe regions, guaranteeing an operation of at least the predetermined combination of the number of operational motors, in the event of partial propulsion control failure resulting in a trajectory that does not collide with the target; and output the control commands to the propulsion control system to activate or not activate one or more motors of the vehicle for the specified time period based on the control commands.

An aspect includes wherein the multi-object coordination system includes a reference system or coordinate system, that includes positions of the vehicle, the target and other objects in the area, if an object's distance is unknown. Another aspect is wherein the vehicle is a vessel propelled on water, and the perturbations acting on the multi-object coordination system includes one or a combination of an amount of one or more water currents, an amount of one or more winds or amounts of other natural forces, such that the multi-object coordination system is a multi-object nautical coordination system.

Unclaimed Independent claim: A controller for controlling an operation of a vehicle to rendezvous the vehicle with a target over a finite time horizon, and a transceiver accepts data including vehicle and target data at a specified time period within the finite time horizon comprising: a processor at the specified time period is to access a memory having stored unsafe regions, and select a set of unsafe regions corresponding to an orbit the target is located from the stored unsafe regions, wherein the set of unsafe regions represents regions of space around the target guaranteeing collision trajectories with the target, in an event of total spacecraft thruster failure; formulate the set of unsafe regions as safety constraints; update a controller having a model of dynamics of the vehicle with the accepted data, and subject the updated controller to the safety constraints to generate control commands that produce a collision free rendezvous trajectory which avoids the set of unsafe regions, guaranteeing a collision free trajectory with respect to the target in the event of the total vehicle thruster failure, so the vehicle does not collide with the target; and output the control commands to activate or not activate one or more thrusters of the vehicle for the specified time period based on the control commands.

Definitions

Space rendezvous: Space rendezvous can be a set of orbital maneuvers during which two spacecraft (or a chaser spacecraft and a target, (i.e. the target can be another spacecraft, space station, celestial body or orbital debris), arrive at the same orbit and approach to a very close distance (e.g. within visual contact).

Celestial System (Celestial Reference System): In astronomy, a celestial coordinate system (or celestial reference system) is a system for specifying positions of satellites, planets, stars, galaxies, and other celestial objects relative to physical reference points available to a situated observer (e.g. the true horizon and north cardinal direction to an observer situated on the Earth's surface). Coordinate systems can specify an object's position in three-dimensional space or plot merely its direction on a celestial sphere, if the object's distance is unknown or trivial. The coordinate systems are implemented in either spherical or rectangular coordinates. Spherical coordinates, projected on the celestial sphere, are analogous to the geographic coordinate system used on the surface of Earth. These differ in their choice of fundamental plane, which divides the celestial sphere into two equal hemispheres along a great circle. Rectangular coordinates, in appropriate units, are simply the cartesian equivalent of the spherical coordinates, with the same fundamental (x,y) plane and primary (x-axis) direction. Each coordinate system is named after its choice of fundamental plane.

FIG. 14A, FIG. 14B, FIG. 14C, FIG. 14D and FIG. 14E are schematic diagrams illustrating of some conventional parameters to better understand aspects used for implementing some aspects of the methods and systems, according to some embodiments of the present disclosure.

Figures 14A, 14B:
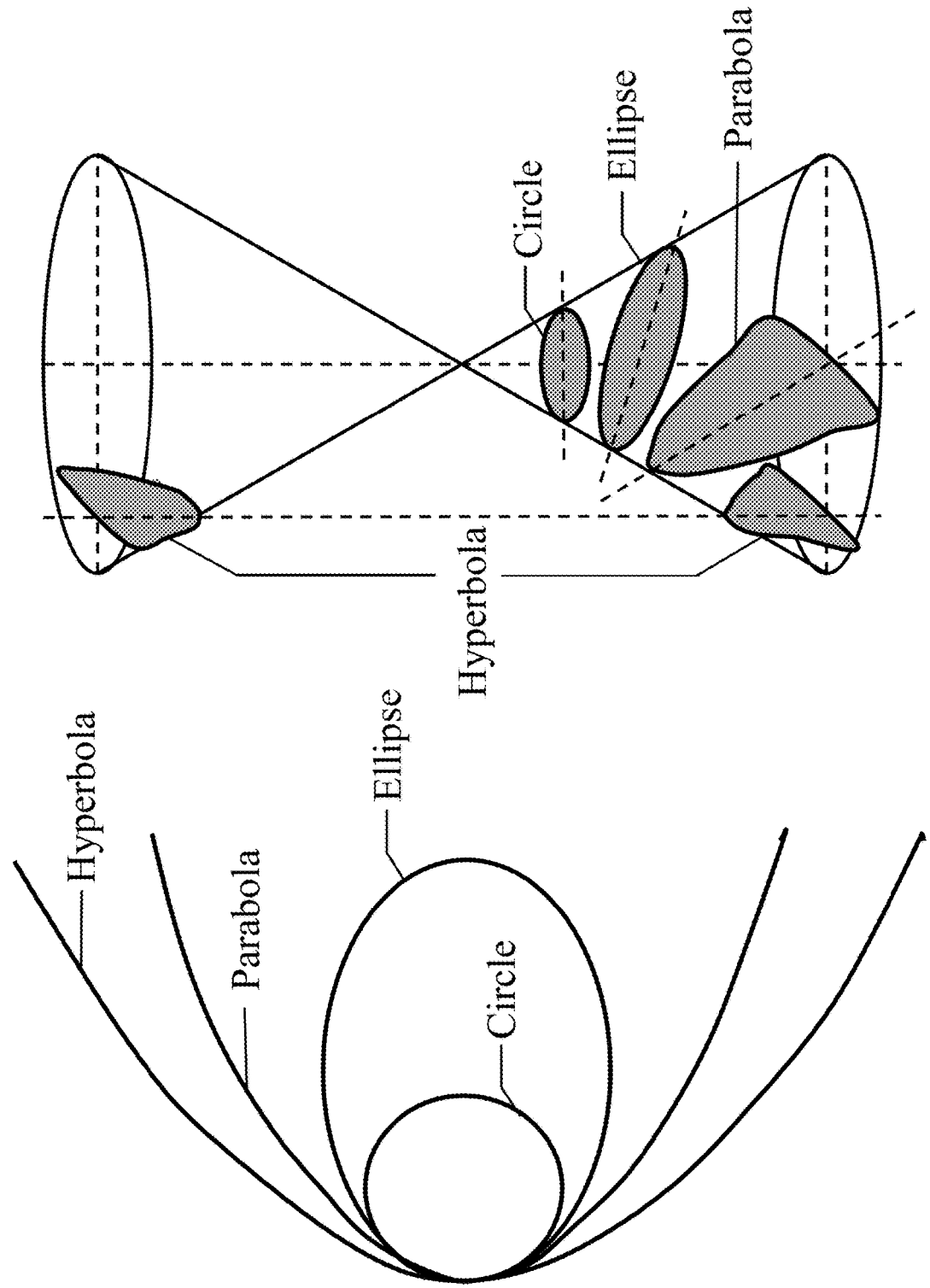
FIG. 14A, FIG. 14B, FIG. 14C, FIG. 14D and FIG. 14E are schematic diagrams of some conventional parameters to better understand aspects used for implementing some aspects of the methods and systems.

Conic Sections: Referring to the FIG. 14A and FIG. 14B, a conic section, or just conic, is a curve formed by passing a plane through a right circular cone. FIG. 14A and FIG. 14B show an angular orientation of a plane relative to the cone that determines whether the conic section is a circle, ellipse, parabola, or hyperbola. The circle and the ellipse arise when the intersection of cone and plane is a bounded curve. The circle is a special case of the ellipse in which the plane is perpendicular to the axis of the cone. If the plane is parallel to a generator line of the cone, the conic is called a parabola. Finally, if the intersection is an unbounded curve and the plane is not parallel to a generator line of the cone, the figure is a hyperbola. In the latter case, the plane will intersect both halves of the cone, producing two separate curves. All conic sections can be defined in terms of the eccentricity. The type of conic section is also related to the semi-major axis and the energy. The table below shows the relationships between eccentricity, semi-major axis, and energy and the type of conic section. For example,

- conic section for the circle can have an eccentricity, e of 0, a semi-major axis=the radius, and the energy is <0;
- conic section for the ellipse can have an eccentricity, e of 0<e<1, a semi-major axis=>0, and the energy is <0;
- conic section for the parabola can have an eccentricity, e of 1, a semi-major axis of infinity, and the energy is 0; and
- conic section for the hyperbola can have an eccentricity, e of >1, a semi-major axis <0, and the energy is >0.

Satellite orbits can be any of the four conic sections. This page deals mostly with elliptical orbits, though we conclude with an examination of the hyperbolic orbit.

Figure 14D:
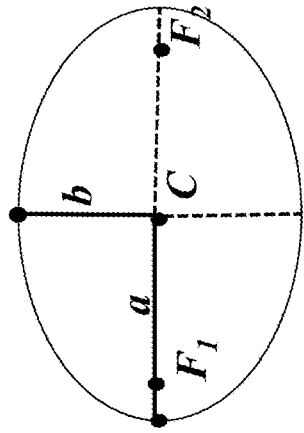
Figure 14C:
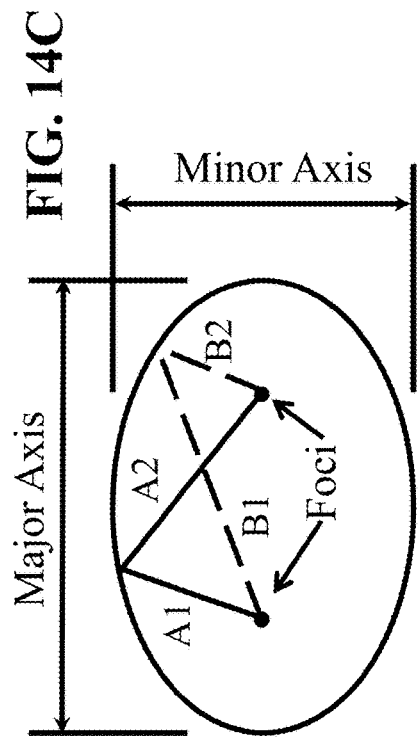
Figure 14E:
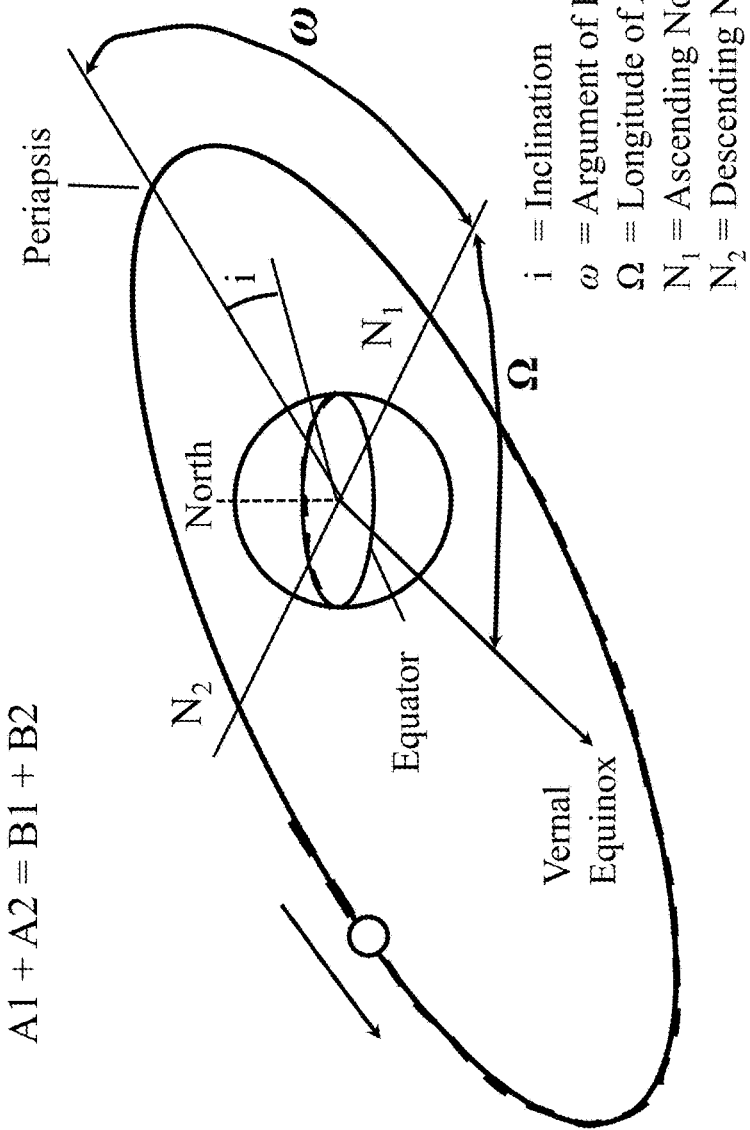

Referring to the FIG. 14C, FIG. 14D and FIG. 14E, to mathematically describe a conventional orbit one must define six quantities, called orbital elements. They are Semi-Major Axis, a
Eccentricity, e
Inclination, i
Argument of Periapsis, ω
Time of Periapsis Passage, T
Longitude of Ascending Node, FIG. 14C to FIG. 14E show a conventional orbiting satellite that follows an oval shaped path known as an ellipse with the body being orbited, called the primary, located at one of two points called foci. FIG. 14C shows an ellipse defined to be a curve with the following property: for each point on an ellipse, the sum of its distances from two fixed points, called foci, is constant. The longest and shortest lines that can be drawn through the center of an ellipse are called the major axis and minor axis, respectively. The semi-major axis is one-half of the major axis and represents a satellite's mean distance from its primary. Eccentricity is the distance between the foci divided by the length of the major axis and is a number between zero and one. An eccentricity of zero indicates a circle.

FIG. 14E shows inclination i that is the angular distance between a satellite's orbital plane and the equator of its primary (or the ecliptic plane in the case of heliocentric, or sun centered, orbits). An inclination i of zero degrees indicates an orbit about the primary's equator in the same direction as the primary's rotation, a direction called prograde (or direct). An inclination i of 90 degrees indicates a polar orbit. An inclination i of 180 degrees indicates a retrograde equatorial orbit. A retrograde orbit is one in which a satellite moves in a direction opposite to the rotation of its primary.

Still referring to FIG. 14E, periapsis co is the point in an orbit closest to the primary (i.e. for an object moving in an elliptical orbit about another celestial body, the point of closest approach is the periapsis, and at this point in the orbit, the object is travelling at its greatest speed via Kepler's Second Law). The opposite of periapsis co, the farthest point in an orbit, is called apoapsis (i.e. an object moving in an elliptical orbit about another celestial body, the point of greatest separation is the apoapsis, at this point in the orbit, the object is travelling at its slowest speed via Kepler's Second Law). A perihelion is a position of closest approach, i.e. the shortest distance between the Sun and the planet, at this point in the orbit, the planet is moving at its maximum speed via Kepler's Second Law. An aphelion is a greatest distance between the Sun and the planet, at this point in the orbit, the planet is moving at its slowest speed via Kepler's Second Law, such that the aphelion refers specifically to orbits around the Sun, and is equivalent to the apoapsis of a general orbit. Wherein, the periapsis ω and apoapsis are usually modified to apply to the body being orbited, such as perihelion and aphelion for the Sun, perigee and apogee for Earth, perijove and apojove for Jupiter, perilune and apolune for the Moon, etc. The argument of periapsis ω is the angular distance between the ascending node $N_1$ and the point of periapsis (see FIG. 11E). The time of periapsis passage T is the time in which a satellite moves through its point of periapsis.

Periapsis: The point of a body's elliptical orbit about the system's center of mass where the distance between the body and the center of mass is at its minimum. Wherein, the argument of periapsis (also called argument of perifocus or argument of pericenter), symbolized as co, is one of the orbital elements of an orbiting body. Parametrically, co is the angle from the body's ascending node to its periapsis, measured in the direction of motion. For specific types of orbits, words including perihelion (for heliocentric orbits), perigee (for geocentric orbits), Periastron (for orbits around stars), and so on may replace the word periapsis. (See apsis for more information.) An argument of periapsis of 0° means that the orbiting body will be at its closest approach to the central body at the same moment that it crosses the plane of reference from South to North. An argument of periapsis of 90° means that the orbiting body will reach periapsis at its north most distance from the plane of reference. Adding the argument of periapsis to the longitude of the ascending node gives the longitude of the periapsis. However, especially in discussions of binary stars and exoplanets, the terms "longitude of periapsis" or "longitude of periastron" are often used synonymously with "argument of periapsis".

Apoapsis: The point of a body's elliptical orbit about the system's centre of mass where the distance between the body and the centre of mass is at its maximum.

Nodes: are the points where an orbit crosses a plane, such as a satellite crossing the Earth's equatorial plane. If the satellite crosses the plane going from south to north, the node is the ascending node $N_1$; if moving from north to south, it is the descending node $N_2$. The longitude of the ascending node $N_1$ is the node's celestial longitude. Celestial longitude is analogous to longitude on Earth and is measured in degrees counter-clockwise from zero with zero longitude being in the direction of the vernal equinox Ω.

Types of orbits: Geosynchronous orbits (GEO): are circular orbits around the Earth having a period of 24 hours. A geosynchronous orbit with an inclination of zero degrees is called a geostationary orbit. A spacecraft in a geostationary orbit appears to hang motionless above one position on the Earth's equator. For this reason, they are ideal for some types of communication and meteorological satellites. A spacecraft in an inclined geosynchronous orbit will appear to follow a regular figure-8 pattern in the sky once every orbit. To attain geosynchronous orbit, a spacecraft is first launched into an elliptical orbit with an apogee of 35,786 kin (22,236 miles) called a geosynchronous transfer orbit (GTO). The orbit is then circularized by firing the spacecraft's engine at apogee. Polar orbits (PO): are orbits with an inclination of 90 degrees. Polar orbits are useful for satellites that carry out mapping and/or surveillance operations because as the planet rotates the spacecraft has access to virtually every point on the planet's surface. Walking orbits: An orbiting satellite is subjected to a great many gravitational influences. First, planets are not perfectly spherical and they have slightly uneven mass distribution. These fluctuations have an effect on a spacecraft's trajectory. In addition, the sun, moon, and planets contribute a gravitational influence on an orbiting satellite. With proper planning, it is possible to design an orbit, which takes advantage of these influences to induce a precession in the satellite's orbital plane. The resulting orbit is called a walking orbit. Sun synchronous orbits (SSO): are walking orbits whose orbital plane processes with the same period as the planet's solar orbit period. In such an orbit, a satellite crosses periapsis at about the same local time every orbit. This is useful if a satellite is carrying instruments, which depend on a certain angle of solar illumination on the planet's surface. In order to maintain an exact synchronous timing, it may be necessary to conduct occasional propulsive maneuvers to adjust the orbit. Molniya orbits: are highly eccentric Earth orbits with periods of approximately 12 hours (2 revolutions per day). The orbital inclination is chosen so the rate of change of perigee is zero, thus both apogee and perigee can be maintained over fixed latitudes. This condition occurs at inclinations of 63.4 degrees and 116.6 degrees. For these orbits, the argument of perigee is typically placed in the southern hemisphere, so the satellite remains above the northern hemisphere near apogee for approximately 11 hours per orbit. This orientation can provide good ground coverage at high northern latitudes. Hohmann transfer orbits: are interplanetary trajectories whose advantage is that they consume the least possible amount of propellant. A Hohmann transfer orbit to an outer planet, such as Mars, is achieved by launching a spacecraft and accelerating it in the direction of Earth's revolution around the sun until it breaks free of the Earth's gravity and reaches a velocity, which places it in a sun orbit with an aphelion equal to the orbit of the outer planet. Upon reaching its destination, the spacecraft must decelerate so that the planet's gravity can capture it into a planetary orbit. For example, to send a spacecraft to an inner planet, such as Venus, the spacecraft is launched and accelerated in the direction opposite of Earth's revolution around the sun (i.e. decelerated) until it achieves a sun orbit with a perihelion equal to the orbit of the inner planet. It should be noted that the spacecraft continues to move in the same direction as Earth, only more slowly. To reach a planet requires that the spacecraft be inserted into an interplanetary trajectory at the correct time so that the spacecraft arrives at the planet's orbit when the planet will be at the point where the spacecraft will intercept it. This task is comparable to a quarterback "leading" his receiver so that the football and receiver arrive at the same point at the same time. The interval of time in which a spacecraft must be launched in order to complete its mission is called a launch window. Near-rectilinear halo orbits (NRHOs): can be defined as "almost stable" orbits where stability is measured using stability indexes $v$.

CR3BP model: Near rectilinear halo orbits are members of the broader set of L1 and L2 families of halo orbits, that is, foundational structures that exist in the dynamical environment modeled in terms of multiple gravitational bodies. L1 is a point 1/100 of the way from Earth to the sun, or the first Lagrangian point, where centripetal force and the gravitational pulls of Earth and sun all cancel out. It is one of five such points in the Earth-sun system where a space probe could in principle sit forever as though balanced on the gravitational version of the head of a pin. Another one, L2, is on the far side of Earth from the sun, 1.6 million kilometers out. Both L1 and L2 are ideal venues from which to look out toward the universe, and L1 is a good vantage on Earth and the sun, as well. However, they have drawbacks: At L1, a spacecraft's signal would be overwhelmed by the radiation from the sun behind it. At L2, Earth's shadow blocks the solar radiation a probe needs to power its instruments. The solution is to put spacecraft into "halo orbits" around the Lagrangian points. A spacecraft in a halo orbit around L1 describes huge, lazy loops perpendicular to the Earth-sun axis, endlessly falling toward the balance point. The fundamental behavior also persists in a higher-fidelity model and, thus, supports potential long-term mission scenarios for spacecraft, possibly crewed, in orbits near the Moon. This type of trajectory is first identified in a simplified representation of the gravitational effects in the Earth-Moon system, i.e., the Circular Restricted Three Body Problem (CR3BP). In the CR3BP model, Near-rectilinear halo orbits (NRHOs), i.e. can be defined as "almost stable" orbits where stability is measured using stability indexes $v$, are characterized by favorable stability properties that suggest the potential to maintain NRHO-like motion over a long duration while consuming few propellant resources. Some NRHOs also possess favorable resonance properties that can be exploited for mission design and are particularly useful to avoid eclipses. For actual mission implementations, however, transfers into such orbits, as well as station keeping strategies, must be demonstrated in a higher-fidelity ephemeris model. Station keeping algorithms for libration point orbits have previously been explored within this dynamical regime in the context of both planar Lyapunov and classical three-dimensional halo orbits. However, NRHOs as constructed in the ephemeris regime.

Perturbation: can be a complex motion of a massive body subject to forces other than the gravitational attraction of a single other massive body. The other forces can include a third (fourth, fifth, etc.) body, resistance, as from an atmosphere, and the off-center attraction of an oblate or otherwise misshapen body. The perturbing forces of the Sun on the Moon at two places in its orbit. The dark dotted arrows represent the direction and magnitude of the gravitational force on the Earth. Applying this to both the Earth's and the Moon's position does not disturb the positions relative to each other. When it is subtracted from the force on the Moon (dark solid arrow), what is left is the perturbing force (dark double arrows) on the Moon relative to the Earth. Because the perturbing force is different in direction and magnitude on opposite sides of the orbit, it produces a change in the shape of the orbit.

Figure 15A:
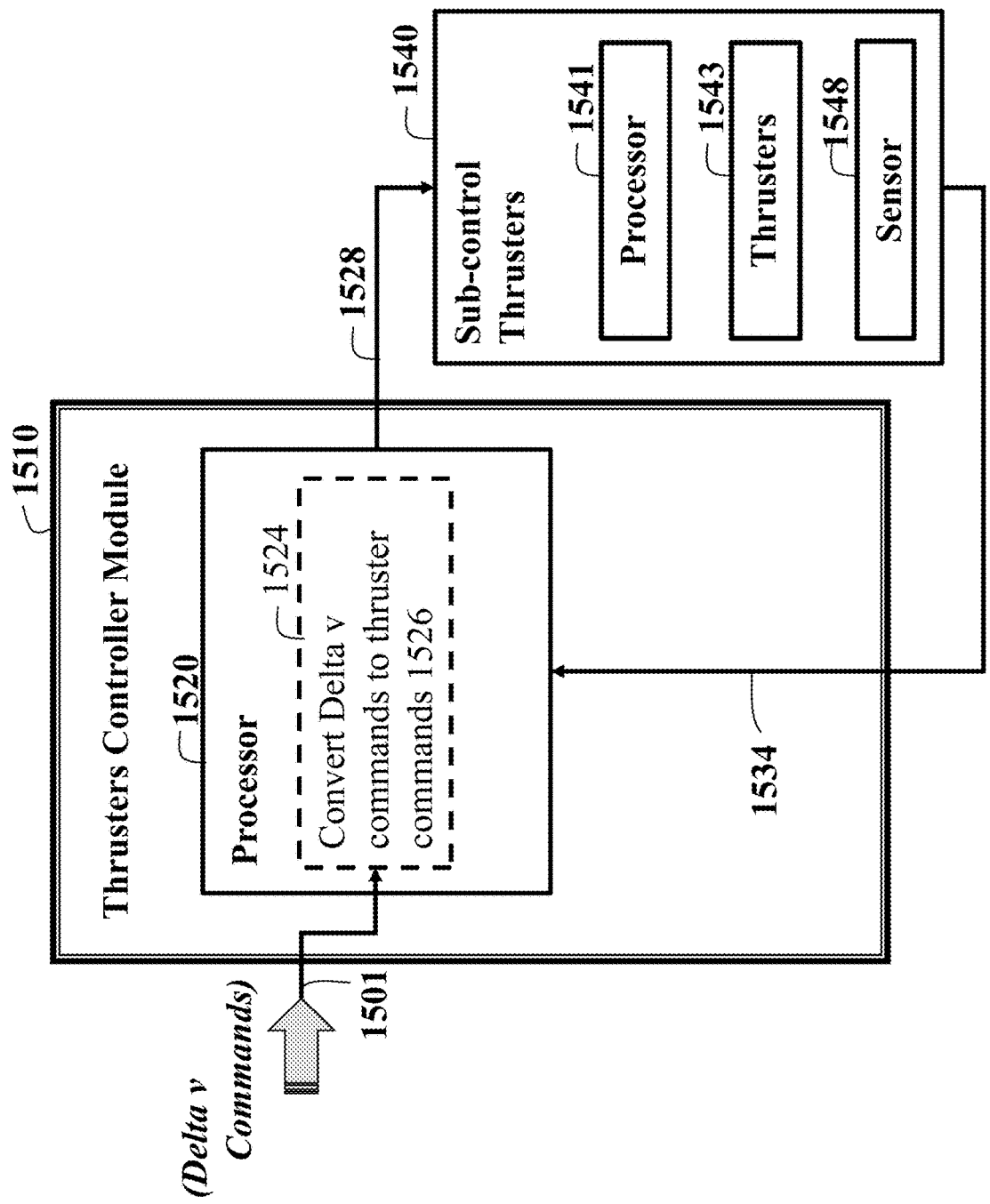
FIG. 15A is a block diagram illustrating some components for implementing the generated control commands, according to an embodiment of the present disclosure.

FIG. 15A is a block diagram illustrating some components for implementing the generated transfer orbit, according to an embodiment of the present disclosure. A thruster controller module 1510 can include a processor 1520 that can convert 1524 the received delta commands 1501 to thruster commands 1526 that can be sent via bus 1528 to the thrusters 1543 of the sub-control thruster 1540, that can be connected to sensors 1548.

Figure 15B:
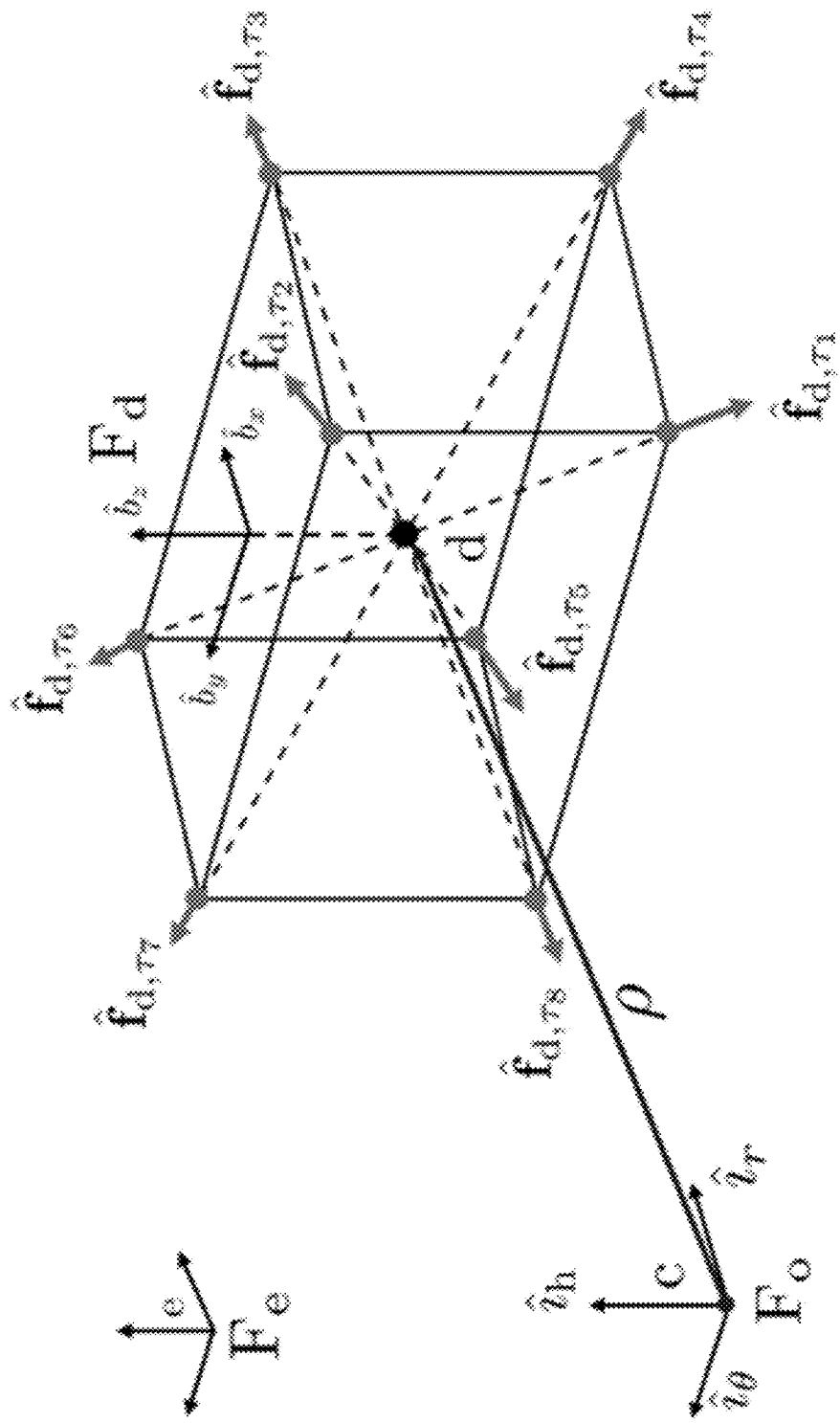
FIG. 15B is a schematic diagram illustrating aspects of a thruster configuration, according to an embodiment of the present disclosure.

FIG. 15B is a schematic diagram illustrating aspects of a thruster configuration, according to an embodiment of the present disclosure. For example, the spacecraft may be equipped with eight thrusters that are mounted at the corners of the spacecraft so that they aligned and produce pure forces that act on the center of mass of the spacecraft without producing any torques that would rotate the spacecraft. The controller will send signals to activate or deactivate the thrusters in order to move the spacecraft along a commanded trajectory.

Figure 15C:
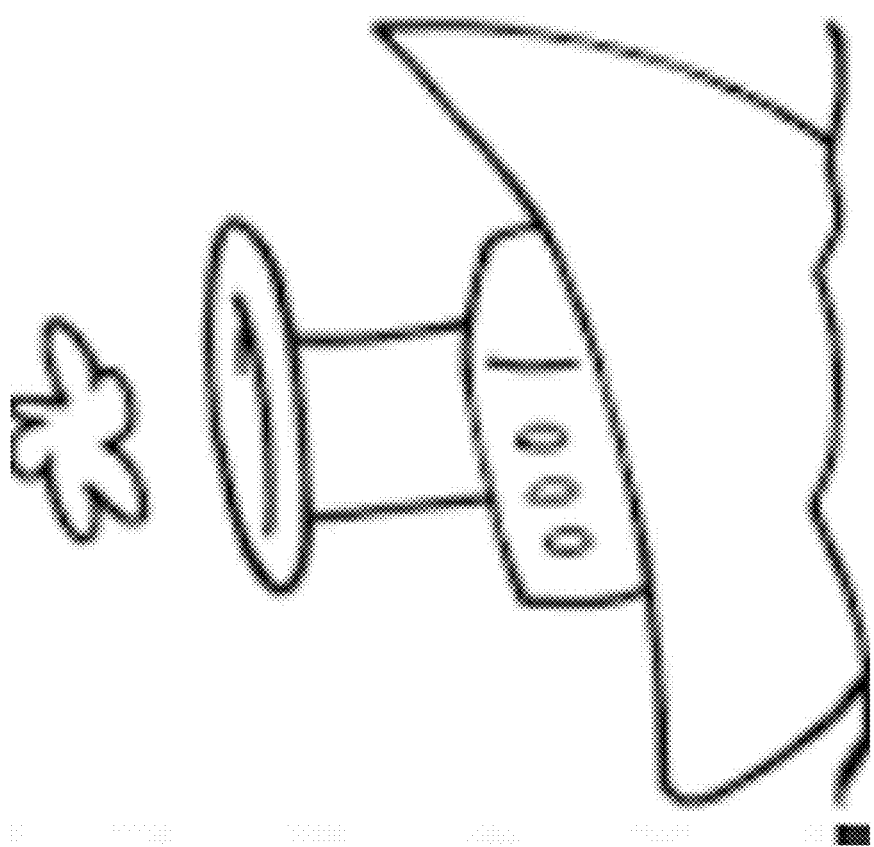
FIG. 15C is a schematic diagram illustrating a motor boat, according to an embodiment of the present disclosure.

FIG. 15C is a schematic diagram illustrating a motor boat, according to an embodiment of the present disclosure. For example, a controller to control a boat to rendezvous the boat with a target in real time over a finite time horizon, wherein the boat and the target form a multi-object coordination system, and transceiver accepts data in real time including values of boat states and target states in the multi-object celestial system, at a specified time period within the finite time horizon, the controller comprising: a guidance and control computer (GCC) processor having an interface to pass information in real time related to a propulsion control system of the boat, the GCC processor at the specified time period is configured to identify an area the target is located in real time from the accepted data; access a memory having unsafe regions, and select a set of unsafe regions corresponding to the target area location from the stored unsafe regions, wherein the set of unsafe regions represents regions within the area around the target in which any operation of the predetermined combination of the number of operational motors does not avoid collision with the target, guaranteeing collision trajectories with the target; formulate the set of unsafe regions as safety constraints; update a controller having a model of dynamics of the boat with the accepted data; generate control commands by subjecting the updated controller to the safety constraints to produce a rendezvous trajectory that avoids the set of unsafe regions, guaranteeing an operation of at least the predetermined combination of the number of operational motors, in the event of partial propulsion control failure resulting in a trajectory that does not collide with the target; and output the control commands to the propulsion control system to activate or not activate one or more motors of the boat for the specified time period based on the control commands.

Figure 16:
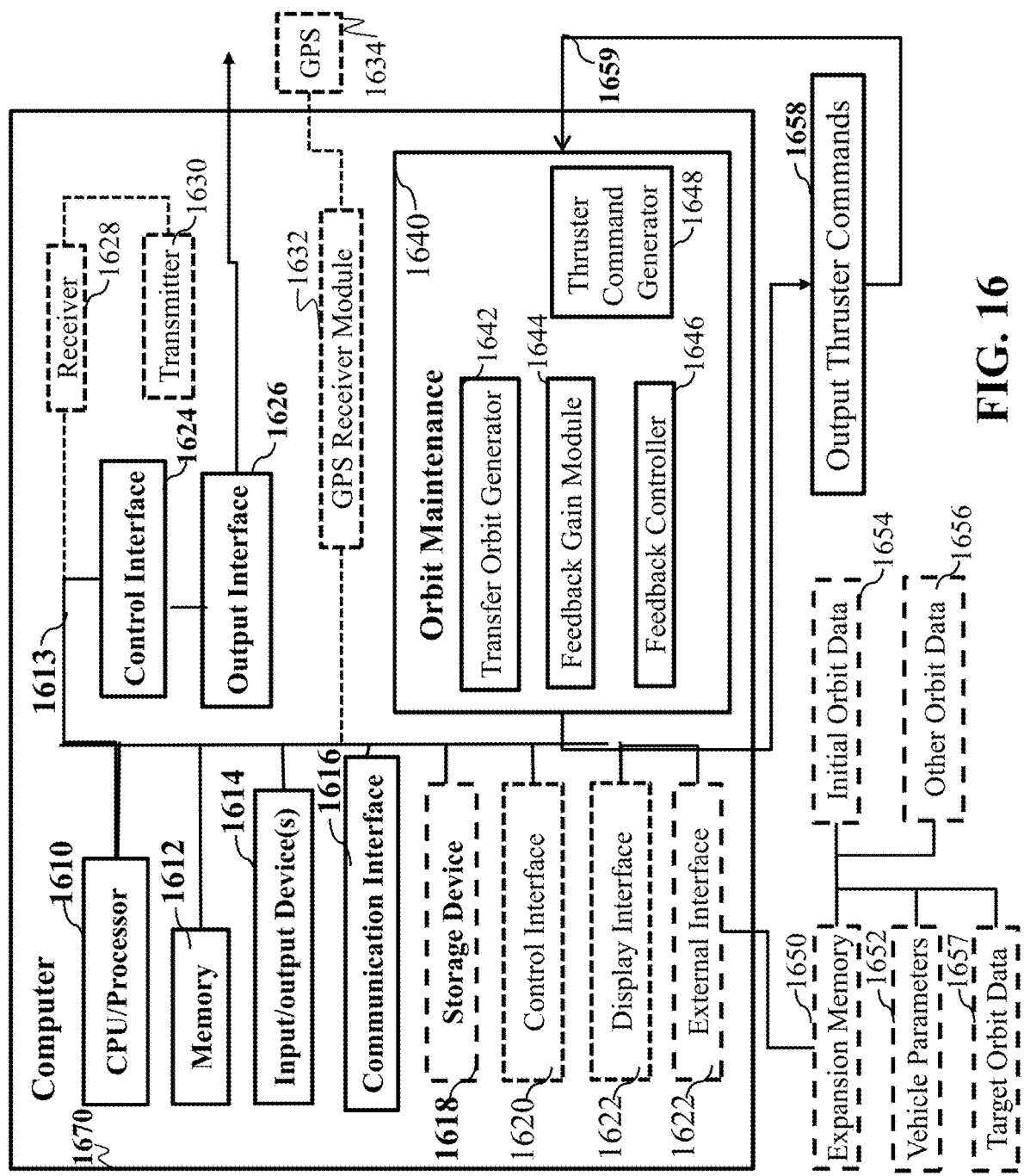
FIG. 16 is a schematic diagram illustrating some components used for implementing the methods and systems, according to some embodiments of the present disclosure.

FIG. 16 is a block diagram illustrating some components that can be used for implementing the systems and methods, according to some embodiments of the present disclosure. For example, a computer system 1670 or network can be adapted for use in determining a transfer orbit for moving a spacecraft or vehicle from an initial orbit about a celestial body (e.g., the Mars or the like) into a target orbit about the celestial body or another celestial body. A CPU or processor(s) 1610 can be connected via a bus system 1613 to a memory 1612, input/output devices 1614 and a communication interface 1616. Also connected to the bus system 1613 can be a storage device 1618, a control interface 1620, display interface 1622, and an external interface 1622. The external interface 1622 can be connected to an expansion memory 1650, vehicle parameters 1652 (i.e. spacecraft specifications, thruster specifications, size, weight, etc.), initial orbit data 1654 (i.e. time, date, parameters including altitude, inclination, eccentricity, etc.) and other orbit data 1656 (i.e. unique orbit data). The bus system 1613 can also connect a control interface 1624, output interface 1626, receiver 1628 and transmitter 1630. Further, the bus system can connect a GPS receiver module 1632 to a GPS 1634.

The bus system 1613 can connect an output thruster command module 1658 to output the thruster commands. Wherein bus 1659 connect back to an Orbit Maintenance to communicate data from a thrusters Controller Module (not shown, see FIG. 16).

Still referring to FIG. 16, the computer 1670 can be a server or a desktop, a laptop, a mobile or other computer device or system with one or more processors 1610. The processor 1610 may be a central processing unit adapted for accessing code in the form of a transfer orbit generator 1642 in a memory 1612 or storage data 1618 of the computer 1670 (or in an expansion memory 1650 or other data storage 1652, 1654, 1656. Contemplated are external storage devices if further required depending upon the specific design and aspect of an intended hardware and goal implementation, according aspects related to systems and methods of the present disclosure. For example, the computer 1670 can be used to implement the steps of the systems and methods, where the memory 1612, and/or storage device 1618 can store data.

The stored data in the memory 1612 of FIG. 16 can include the executable modules, vehicle data and historical space data. For example, the vehicle data can include specifications of the spacecraft, dimensions, weight, performance data under varied conditions including gravitation forces, and other perturbations, i.e. complex motion(s) of a massive body subject to forces other than the gravitational attraction of a single other massive body in space. Further, the vehicle data can include data related to aspects related to vehicle dynamics associated with one or more of the multi-variables, i.e. (1) unusual orbital characteristics of a celestial body, i.e. a natural object which is located outside of Earth's atmosphere, such as the Moon, the Sun, an asteroid, planet, or star; (2) unusual orbital motion the celestial body; (3) celestial body's unusually close orbit around another celestial body; and (4) other known perturbations. The space data can include data related to celestial body(s) system, past missions to celestial body(s) and any other data related to space, the spacecraft and planning orbital designs to other celestial bodies in the universe. For example, stored as space data can include data about the moons of celestial body(s), such as characteristics of celestial body(s) that can be taken into consideration in developing orbital designs from an initial celestial body(s) orbit to a similar target celestial body(s) orbit.

Optionally, the stored data can be stored in the storage device 1618, the external interface 1622, that is connected an expansion memory 1650 that connects to an initial orbit data database 1654, other orbit data database 1656 and vehicle parameters, specifications, performance, etc. data database 1652, of FIG. 16.

Still referring to FIG. 16, the processor 1610 of the computer 1670 may be two or more processors depending upon the specific application. For example, some steps may require a separate processor to ensure a specific processing time or processing speed associated with the systems and methods of the present disclosure. The receiver 1628 or input interface can receive space data that may be up-to-date space data, obtained from either an Earth Mission Control Center or sensors associated with the spacecraft, or some other location, after the stored historical space data stored in the memory 1612. The receiver 1628 and transmitter 1630 can provide a wireless venue for receiving and sending data to, for example, to an Earth Mission Control Center, or some other destination. A GPS receiver module 1632 connected to a GPS 1634 can be used for navigation related aspects. The computer 1670 can include a control interface 1620, display interface 1622, and optionally external devices, control interfaces, displays, sensors, machines, etc., (not shown, see FIG. 16), that are contemplated for uses related to the systems and methods of the present disclosure.

Figure 17:
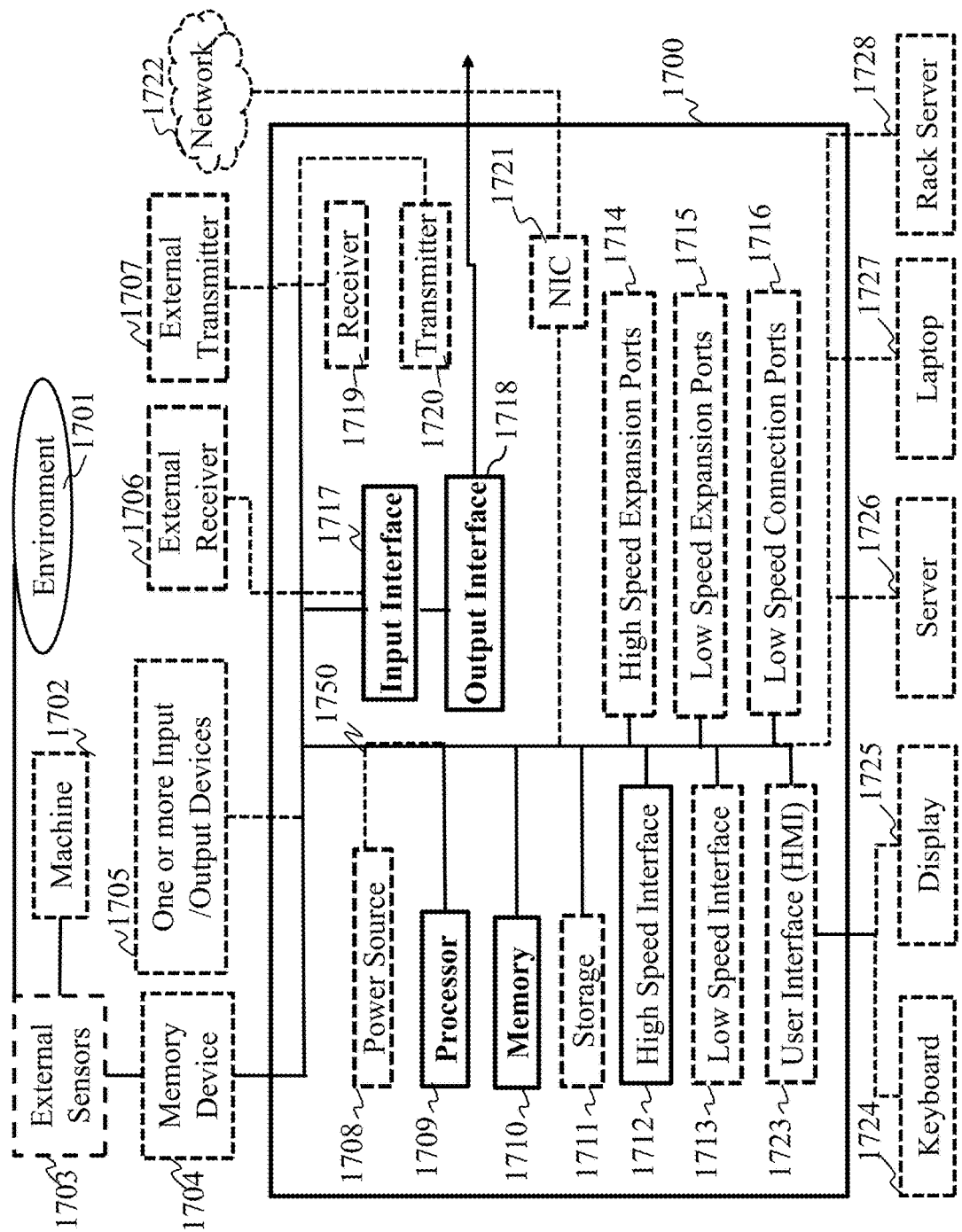
FIG. 17 is a schematic illustrating by non-limiting example a computing apparatus that can be used to implement some techniques of the methods and systems, according to embodiments of the present disclosure.

FIG. 17 is a schematic illustrating by non-limiting example a computing apparatus 1700 that can be used to implement some techniques of the methods and systems, according to embodiments of the present disclosure. The computing apparatus or device 1700 represents various forms of digital computers, such as laptops, desktops, workstations, personal digital assistants, servers, blade servers, mainframes, and other appropriate computers.

The computing device 1700 can include a power source 1708, a processor 1709, a memory 1710, a storage device 1711, all connected to a bus 1750. Further, a high-speed interface 1212, a low-speed interface 1713, high-speed expansion ports 1214 and low speed connection ports 1715, can be connected to the bus 1250. In addition, a low-speed expansion port 1716 is in connection with the bus 1750. Contemplated are various component configurations that may be mounted on a common motherboard, by non-limiting example, 1730, depending upon the specific application. Further still, an input interface 1717 can be connected via bus 1750 to an external receiver 1706 and an output interface 1718. A receiver 1719 can be connected to an external transmitter 1707 and a transmitter 1720 via the bus 1750. Also connected to the bus 1750 can be an external memory 1704, external sensors 1703, machine(s) 1702 and an environment 1701. Further, one or more external input/output devices 1705 can be connected to the bus 1750. A network interface controller (NIC) 1721 can be adapted to connect through the bus 1750 to a network 1722, wherein data or other data, among other things, can be rendered on a third party display device, third party imaging device, and/or third party printing device outside of the computer device 1700.

Still referring to FIG. 17, contemplated is that the memory 1710 can store instructions that are executable by the computer device 1700, historical data, and any data that can be utilized by the methods and systems of the present disclosure. The memory 1710 can include random access memory (RAM), read only memory (ROM), flash memory, or any other suitable memory systems. The memory 1710 can be a volatile memory unit or units, and/or a non-volatile memory unit or units. The memory 1710 may also be another form of computer-readable medium, such as a magnetic or optical disk.

A storage device 1711 can be adapted to store supplementary data and/or software modules used by the computer device 1700. For example, the storage device 1711 can store historical data and other related data as mentioned above regarding the present disclosure. Additionally, or alternatively, the storage device 1711 can store historical data similar to data as mentioned above regarding the present disclosure. The storage device 1711 can include a hard drive, an optical drive, a thumb-drive, an array of drives, or any combinations thereof. Further, the storage device 1711 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1709), perform one or more methods, such as those described above.

Still referring to FIG. 17, the system can be linked through the bus 1750 optionally to a display interface or user Interface (HMI) 1723 adapted to connect the system to a display device 1725 and keyboard 1724, wherein the display device 1725 can include a computer monitor, camera, television, projector, or mobile device, among others. The computer device 1700 can include a user input interface 1717 adapted to a printer interface (not shown) can also be connected through bus 1750 and adapted to connect to a printing device (not shown), wherein the printing device can include a liquid inkjet printer, solid ink printer, large-scale commercial printer, thermal printer, UV printer, or dye-sublimation printer, among others.

Still referring to FIG. 17, the high-speed interface 1712 manages bandwidth-intensive operations for the computing device 1700, while the low-speed interface 1713 manages lower bandwidth-intensive operations. Such allocation of functions is an example only. In some implementations, the high-speed interface 1712 can be coupled to the memory 1710, a user interface (HMI) 1723, and to a keyboard 1724 and display 1725 (e.g., through a graphics processor or accelerator), and to the high-speed expansion ports 1714, which may accept various expansion cards (not shown) via bus 1750. In the implementation, the low-speed interface 1713 is coupled to the storage device 1711 and the low-speed expansion port 1715, via bus 1750. The low-speed expansion port 1715, which may include various communication ports (e.g., USB, Bluetooth, Ethernet, wireless Ethernet) may be coupled to one or more input/output devices 1705, and other devices a keyboard 1724, a pointing device (not shown), a scanner (not shown), or a networking device such as a switch or router, e.g., through a network adapter.

The computing device 1700 may be implemented in a number of different forms, as shown in the figure. For example, it may be implemented as a standard server 1726, or multiple times in a group of such servers. In addition, it may be implemented in a personal computer such as a laptop computer 1727. It may also be implemented as part of a rack server system 1728. Alternatively, components from the computing device 1700 may be combined with other components in a mobile device (not shown). Each of such devices may contain one or more of the computing device and the mobile computing device, and an entire system may be made up of multiple computing devices communicating with each other.

EMBODIMENTS

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for controlling an operation of a vehicle to rendezvous the vehicle with a target over a finite time horizon, comprising:
a transceiver that accepts data including values of vehicle states and target states in a multi-object celestial system at a specified time period within the finite time horizon;
a processor at the specified time period that is configured to:
access a memory having stored passive unsafe regions, and select a set of passive unsafe regions corresponding to an orbit that the target is located at the specified time period, wherein the set of passive unsafe regions represents regions of space around the target guaranteeing collision trajectories with the target, in an event of total spacecraft thruster failure and wherein the set of passive unsafe regions are determined by computing backwards reachable sets of a region around the target under no control input to the vehicle, such that the region around the target is an approach ellipsoid (AE) region;
formulate the set of passive unsafe regions as passive safety constraints;
update a controller having a model of dynamics of the vehicle with the accepted data, and subject the updated controller to the passive safety constraints to generate control commands that produce a collision free rendezvous trajectory which avoids the set of passive unsafe regions, guaranteeing a collision-free trajectory with respect to the target in the event of the total vehicle thruster failure, so the vehicle does not collide with the target; and
output the control commands to activate or not activate one or more thrusters of the vehicle for the specified time period based on the control commands.

2. The system of claim 1, wherein the vehicle states and the target states in the multi-object celestial system includes one or combination of positions, orientations, and translational and angular velocities of the vehicle and the target, and perturbations acting on the multi-object celestial system, wherein the vehicle and the target form the multi-object celestial system.

3. The system of claim 2, wherein the perturbations acting on the multi-object celestial system are natural orbital forces including solar and lunar gravitational perturbations, anisotropic gravitational perturbations due to a central body's non-sphericity, solar radiation pressure, and air drag.

4. The system of claim 1, wherein the multi-object celestial system includes a celestial coordinate system, that specifies positions of the vehicle, the target and other celestial objects in a three-dimensional space, or plots a direction on a celestial sphere, if an object's distance is unknown.

5. The system of claim 4, wherein the celestial objects include Earth as a primary body around which the target orbits, or the Earth as a primary body and Moon as a secondary body, so that the target is in a halo orbit, a periodic three-dimensional orbit near one of a L1 Lagrange point, L2 Lagrange points or L3 Lagrange points.

6. The system of claim 1, wherein the processor is a guidance and control computer (GCC) in communication with the transceiver and the memory, such that the target orbit is determined based on uploaded ephemeris from a ground station, based on ground data obtained in satellite tracking databases, or estimated from onboard sensor measurements on the vehicle obtained from the accepted data.

7. The system of claim 1, wherein the target is one of a spacecraft, a celestial body or orbital debris, and wherein a region around the target is one of an approach ellipsoid (AE) region or a keep-out sphere (KOS) region.

8. The system of claim 7, wherein a region around the target is one of an approach polytope (AP) region or a keep-out polytope (KOP) region.

9. The system of claim 1, wherein the target orbit is one of a circular orbit, an elliptic orbit, a halo orbit, a near rectilinear halo orbit or a quasi-satellite orbit.

10. The system of claim 1, wherein to access the passive unsafe regions from the memory, the processor identifies the target orbit location at the specified time period from the accepted data, accesses a passive unsafe region (PUR) database from the memory, and using the target orbit location identifies a corresponding set of PURs for the target orbit from the PUR database.

11. The system of claim 1, wherein the target is a spacecraft, a celestial body or orbital debris.

12. The system of claim 11, wherein the backwards reachable sets are computed backwards-in-time from the target region, as regions of state-space that passively drift under no control to the target region.

13. The system of claim 11, wherein the backwards reachable sets are one of ellipsoids, polytopes or zonotopes.

14. The system of claim 11, wherein the computations of the backwards reachable sets of the region around the target are performed offline and stored in memory.

15. The system of claim 11, wherein the computations of the backwards reachable sets of the region around the target are performed online, and in real time based on an estimated position of the target from onboard sensor measurements on the vehicle and stored in memory.

16. The system of claim 11, wherein the target region is time-varying as the target moves along the target orbit such that the backwards reachable sets are computed for multiple target positions and target region positions along the target orbit.

17. The system of claim 1, wherein the controller is a model predictive controller (MPC).

18. The system of claim 17, wherein the MPC uses a local convexification of the set of passive unsafe regions to formulate linear passive safety constraints that are only satisfied when a vehicle state is not inside a passive unsafe region.

19. The system of claim 18, wherein the local convexification of the set of passive unsafe regions is achieved by computing a half space constraint that approximates a passive unsafe region boundary.

20. The system of claim 19, wherein the half space constraint is formulated as a chance constraint which requires that the half space constraint be satisfied with at least a priori specified probability level due to an uncertainty regarding a position of the vehicle or the target, and/or an uncertainty of a thruster magnitude or a direction.

21. The system of claim 1, wherein the updated controller is subjected to the passive safety constraints by formulating an optimal control problem that includes the passive safety constraints so that when optimized over a set of admissible control inputs, an optimizer generates the control commands.

22. The system of claim 1, wherein the control commands are generated as a solution to a model predictive control policy that produces the control commands by optimizing a cost function over a receding horizon.

23. The system of claim 1, wherein the control commands are generated for each specified time period of multiple specified time periods in the finite time horizon, or generated iteratively over a receding time-horizon.

24. The system of claim 23, wherein the control commands are generated iteratively, and wherein at least one iteration includes:
updating one or combination of the components of the cost function; and
weights of the components of the cost function and passive safety constraints based on a change of a desired operation of the spacecraft.

25. The system of claim 24, wherein for each iteration at a next sequential specified time period, there are different sets of passive unsafe regions.

26. A method to control a spacecraft to rendezvous the spacecraft with a target over a finite time horizon, wherein the spacecraft and the target form a multi-object celestial system, the method comprising:
accepting data including values of spacecraft states and target states in the multi-object celestial system at a specified time period of multiple specified time periods within the finite time horizon;
accessing a memory having stored passive unsafe regions, and selecting a set of passive unsafe regions corresponding to an orbit that the target is located at the specified time period, wherein the set of passive unsafe regions represents regions of space around the target guaranteeing collision trajectories with the target, in an event of total spacecraft thruster failure within the specified time period, and wherein the set of passive unsafe regions are determined by computing backwards reachable sets of a region around the target under no control input to the spacecraft, such that the region around the target is an approach ellipsoid (AE) region;
formulating the set of passive unsafe regions as passive safety constraints;
updating a controller having a model of dynamics of the spacecraft with the accepted data;
generating control commands by subjecting the updated controller to the passive safety constraints to produce a collision free rendezvous trajectory which avoids the set of passive unsafe regions for the specified time period, guaranteeing a collision free trajectory with respect to the target in the event of the total spacecraft thruster failure, so the spacecraft does not collide with the target; and
outputting the control commands to activate or not activate one or more thrusters of the spacecraft for the specified time period based on the control commands.

27. A non-transitory machine-readable medium including instructions stored thereon which, when executed by processing circuitry, configure the processing circuitry to perform operations to perform a method for controlling a spacecraft to rendezvous the spacecraft with a target over a finite time horizon, such that the spacecraft and the target form a multi-object celestial system, the method comprising:
accepting data including values of spacecraft states and target states in the multi-object celestial system at a specified time period of multiple specified time periods within the finite time horizon;
accessing a memory having stored passive unsafe regions, and selecting a set of passive unsafe regions corresponding to an orbit the target is located at the specified time period, wherein the set of passive unsafe regions represents regions of space around the target guaranteeing collision trajectories with the target, in an event of total spacecraft thruster failure within the specified time period, and wherein the set of passive unsafe regions are determined by computing backwards reachable sets of a region around the target under no control input to the spacecraft, such that the region around the target is an approach ellipsoid (AE) region;
formulating the set of passive unsafe regions as passive safety constraints;
updating a controller having a model of dynamics of the spacecraft with the accepted data;
generating control commands by subjecting the updated controller to the passive safety constraints to produce a collision free rendezvous trajectory which avoids the sets of passive unsafe regions for the specified time period, guaranteeing a collision free trajectory with respect to the target in the event of the total spacecraft thruster failure, so the spacecraft does not collide with the target; and outputting the control commands to activate or not activate one or more thrusters of the spacecraft for the specified time period based on the control commands.

\* \* \* \* \*